United States Patent
Gallagher et al.

(10) Patent No.: US 7,374,127 B2
(45) Date of Patent: May 20, 2008

(54) SYSTEMS AND METHODS FOR MAKING PIPE LINERS

(75) Inventors: James L. Gallagher, Little Compton, RI (US); William D. Stringfellow, Houston, TX (US); Kenneth R. Charboneau, Slidell, LA (US); Stephen C. Catha, Houston, TX (US)

(73) Assignee: Smart Pipe Company, Inc., Birmingham, AL (US)

( * ) Notice: Subject to any disclaimer, the term of this patent is extended or adjusted under 35 U.S.C. 154(b) by 493 days.

(21) Appl. No.: 11/172,132

(22) Filed: Jul. 1, 2005

(65) Prior Publication Data

US 2006/0151656 A1 Jul. 13, 2006

Related U.S. Application Data

(63) Continuation-in-part of application No. 11/033,962, filed on Jan. 12, 2005.

(51) Int. Cl.
*B21C 47/02* (2006.01)
(52) U.S. Cl. ...................................... 242/444; 242/438
(58) Field of Classification Search ................ 254/437, 254/438.1, 441.2, 441.1, 444
See application file for complete search history.

(56) References Cited

U.S. PATENT DOCUMENTS

| | | | |
|---|---|---|---|
| 1,722,764 A | 7/1929 | Rasch | 442/240 |
| 2,424,315 A | 7/1947 | Hyatt et al. | 138/128 |
| 2,502,638 A | 4/1950 | Becht | |
| 3,099,190 A | 7/1963 | Allen, Jr. et al. | 93/80 |
| 3,590,567 A * | 7/1971 | Bonikowski et al. | 242/421.7 |
| 3,616,072 A | 10/1971 | Bostrom | 156/468 |
| 3,823,590 A | 7/1974 | Lang | 72/66 |
| 3,905,398 A | 9/1975 | Johansen et al. | 138/124 |
| 4,009,063 A | 2/1977 | Wood | 156/71 |
| 4,120,324 A | 10/1978 | Pahl | 138/137 |
| 4,123,928 A | 11/1978 | Ferrentino | 72/66 |
| 4,135,958 A | 1/1979 | Wood | 156/199 |
| 4,142,352 A | 3/1979 | Greczin | 57/15 |

(Continued)

FOREIGN PATENT DOCUMENTS

| | | |
|---|---|---|
| DE | 2442449 | 3/1976 |
| DE | 4427633 | 2/1995 |

OTHER PUBLICATIONS

Plastic Pipe: Expect Better Materials: Stidger: Gas Utility Manager: Dec. 2003: p. 38, 39.

(Continued)

*Primary Examiner*—Emmanuel M Marcelo
(74) *Attorney, Agent, or Firm*—Guy McClung

(57) ABSTRACT

An apparatus for wrapping material onto and around a pipe, the apparatus including a shaft, the shaft rotatable by a driving apparatus, a payout core containing material to be wrapped onto a pipe, the payout core releasably mounted on the shaft, a deflection arm assembly secured to the shaft for rotation by the shaft, rotation of the shaft rotating the deflection arm assembly with respect to the payout core so that the deflection arm assembly takes material from the payout core and wraps the material onto a pipe adjacent the deflection arm assembly, each of the shaft and deflection arm assembly having a central opening through which is movable the pipe as the pipe is being wrapped.

22 Claims, 28 Drawing Sheets

U.S. PATENT DOCUMENTS

| | | | | |
|---|---|---|---|---|
| 4,366,012 A | | 12/1982 | Wood | 156/93 |
| 4,384,595 A | | 5/1983 | Washkewicz et al. | 138/127 |
| 4,390,574 A | | 6/1983 | Wood | 428/36 |
| 4,446,181 A | | 5/1984 | Wood | 428/36.1 |
| 4,478,661 A | | 10/1984 | Lewis | 156/92 |
| 4,495,018 A | | 1/1985 | Vohrer | 156/187 |
| 4,576,205 A | | 3/1986 | Morinaga et al. | 138/98 |
| 4,609,989 A | * | 9/1986 | Squarci | 700/122 |
| 4,610,403 A | * | 9/1986 | Goekler et al. | 242/439.5 |
| 4,622,196 A | | 11/1986 | Wood | 264/229 |
| 4,756,339 A | | 7/1988 | Buluschek | 138/115 |
| 4,777,984 A | | 10/1988 | Storah | 138/98 |
| 4,836,715 A | | 6/1989 | Wood | 405/150.1 |
| 4,838,477 A | | 6/1989 | Roach et al. | 228/222 |
| 4,851,274 A | | 7/1989 | D'Elia | 428/113 |
| 4,976,290 A | | 12/1990 | Gelin et al. | 138/141 |
| 5,010,440 A | | 4/1991 | Endo | 361/215 |
| 5,035,539 A | | 7/1991 | Kawafuji et al. | 405/184.2 |
| 5,046,558 A | * | 9/1991 | Koster | 166/243 |
| 5,049,006 A | | 9/1991 | Payne | 405/270 |
| 5,072,622 A | | 12/1991 | Roach et al. | 73/40.5 R |
| 5,077,107 A | | 12/1991 | Kaneda et al. | 146/36.1 |
| 5,186,987 A | | 2/1993 | Imoto et al. | 428/34.5 |
| 5,225,021 A | | 7/1993 | Lona | 156/190 |
| 5,271,433 A | | 12/1993 | Schwert et al. | 138/98 |
| 5,395,472 A | | 3/1995 | Mandich | 145/287 |
| 5,497,809 A | | 3/1996 | Wolf | 138/113 |
| 5,501,248 A | | 3/1996 | Kiest, Jr. | 138/98 |
| 5,517,812 A | * | 5/1996 | Simmons | 57/18 |
| 5,531,390 A | * | 7/1996 | Gustafson | 242/441.2 |
| 5,551,484 A | | 9/1996 | Charboneau | 138/104 |
| 5,632,952 A | | 5/1997 | Mandich | 264/516 |
| 5,634,743 A | | 6/1997 | Chandler | 405/150.1 |
| 5,649,675 A | * | 7/1997 | Phelps | 242/441.2 |
| 5,680,885 A | | 10/1997 | Catallo | 138/98 |
| 5,720,445 A | * | 2/1998 | Sakurai et al. | 242/438.1 |
| 5,762,450 A | | 6/1998 | Schmager | 405/154 |
| 5,868,169 A | | 2/1999 | Catallo | 138/98 |
| 5,897,729 A | * | 4/1999 | Bikson et al. | 156/172 |
| 5,921,285 A | | 7/1999 | Quigley et al. | 138/125 |
| 5,931,199 A | | 8/1999 | Kittson et al. | 138/98 |
| 5,933,945 A | | 8/1999 | Thomeer et al. | 29/825 |
| 6,004,639 A | | 12/1999 | Quigley et al. | 428/36.3 |
| 6,058,978 A | | 5/2000 | Paletta et al. | 138/98 |
| 6,098,665 A | | 8/2000 | Grace | 138/98 |
| 6,098,913 A | * | 8/2000 | Demore | 242/447.3 |
| 6,170,531 B1 | | 1/2001 | Jung et al. | 138/98 |
| 6,220,079 B1 | | 4/2001 | Taylor et al. | 73/37 |
| 6,357,485 B2 | | 3/2002 | Quigley et al. | 138/125 |
| 6,431,490 B1 | * | 8/2002 | Monget et al. | 242/444 |
| 6,446,672 B1 | | 9/2002 | Kalman | 138/127 |
| 6,455,115 B1 | | 9/2002 | DeMeyer | 428/36.2 |
| 6,572,306 B2 | | 6/2003 | Prusak | 405/183.5 |
| 6,601,600 B1 | | 8/2003 | Taylor | 137/15.04 |
| 6,619,886 B1 | | 9/2003 | Harrington | 405/184.2 |
| 6,627,281 B2 | | 9/2003 | DeMeyer | 428/36.1 |
| 6,634,388 B1 | | 10/2003 | Taylor et al. | 138/114 |
| 6,663,808 B2 | | 12/2003 | DeMeyer | 264/171.26 |
| 6,670,880 B1 | | 12/2003 | Hall et al. | 336/132 |
| 6,708,729 B1 | | 3/2004 | Smith | 138/98 |
| 6,759,968 B2 | | 7/2004 | Zierolf | 340/854.8 |
| 6,769,454 B2 | | 8/2004 | Fraser et al. | 138/127 |
| 6,782,932 B1 | | 8/2004 | Reynolds, Jr. et al. | 156/351 |
| 6,785,004 B2 | | 8/2004 | Kersey et al. | 356/478 |
| 6,824,689 B2 | | 11/2004 | Wang et al. | 210/660 |
| 6,945,279 B2 | | 9/2005 | Baba et al. | 138/137 |
| 2002/0124898 A1 | | 9/2002 | Renaud et al. | 138/98 |
| 2003/0051795 A1 | | 3/2003 | Burgess | 156/169 |
| 2003/0206989 A1 | | 11/2003 | DeMeyer | 425/392 |
| 2004/0025951 A1 | | 2/2004 | Baron et al. | 138/98 |
| 2004/0144440 A1 | | 7/2004 | Lundberg et al. | 138/130 |

OTHER PUBLICATIONS

What Does A Pipeline Incident Really Cost?: Selig et al: Gas Utility Manger: Dec. 2003: pp. 40-45.
Leakage Detection Using Fiber Optics Distributed Temperature Monitoring: Nikles et al: SPIE: Mar. 2004: 8 pp.
Health Monitoring Of A Pipeline Based On Distributed Strain And Temperature Measurements: Glisic et al: SMARTEC SA: 2003: 9 pp.
Tiny tubes loom large: Roper: Houston Chronicle: Mar. 6, 2005: 3 pp.
PCT/GB2005/050204: Int'l Search Report: 5 pp.: mailed Apr. 6, 2006.
PCT/GB2005/050204: Written Opinion of the Int'l Searching Authority: 9 pp.: mailed Apr. 6, 2006.

* cited by examiner

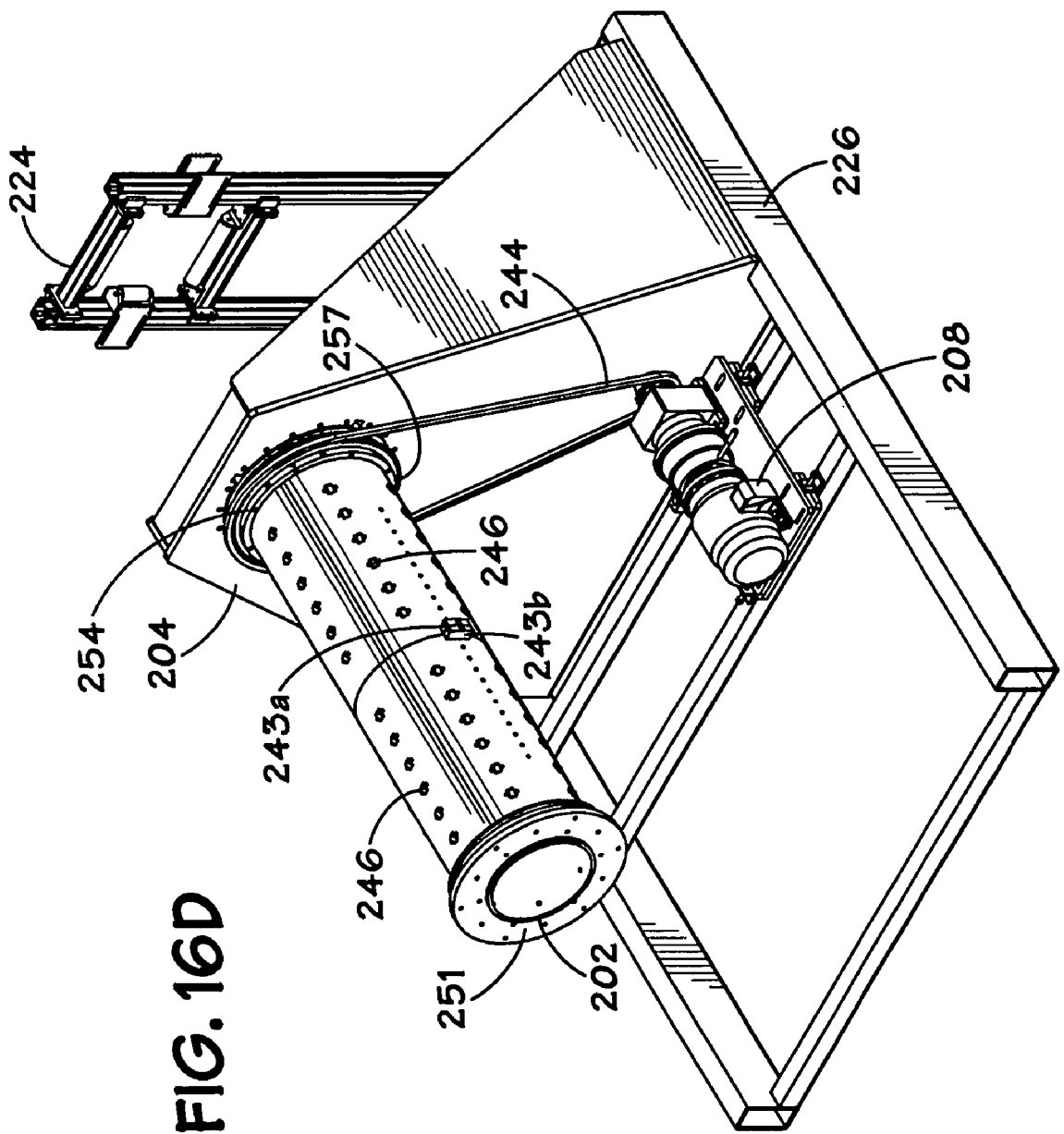

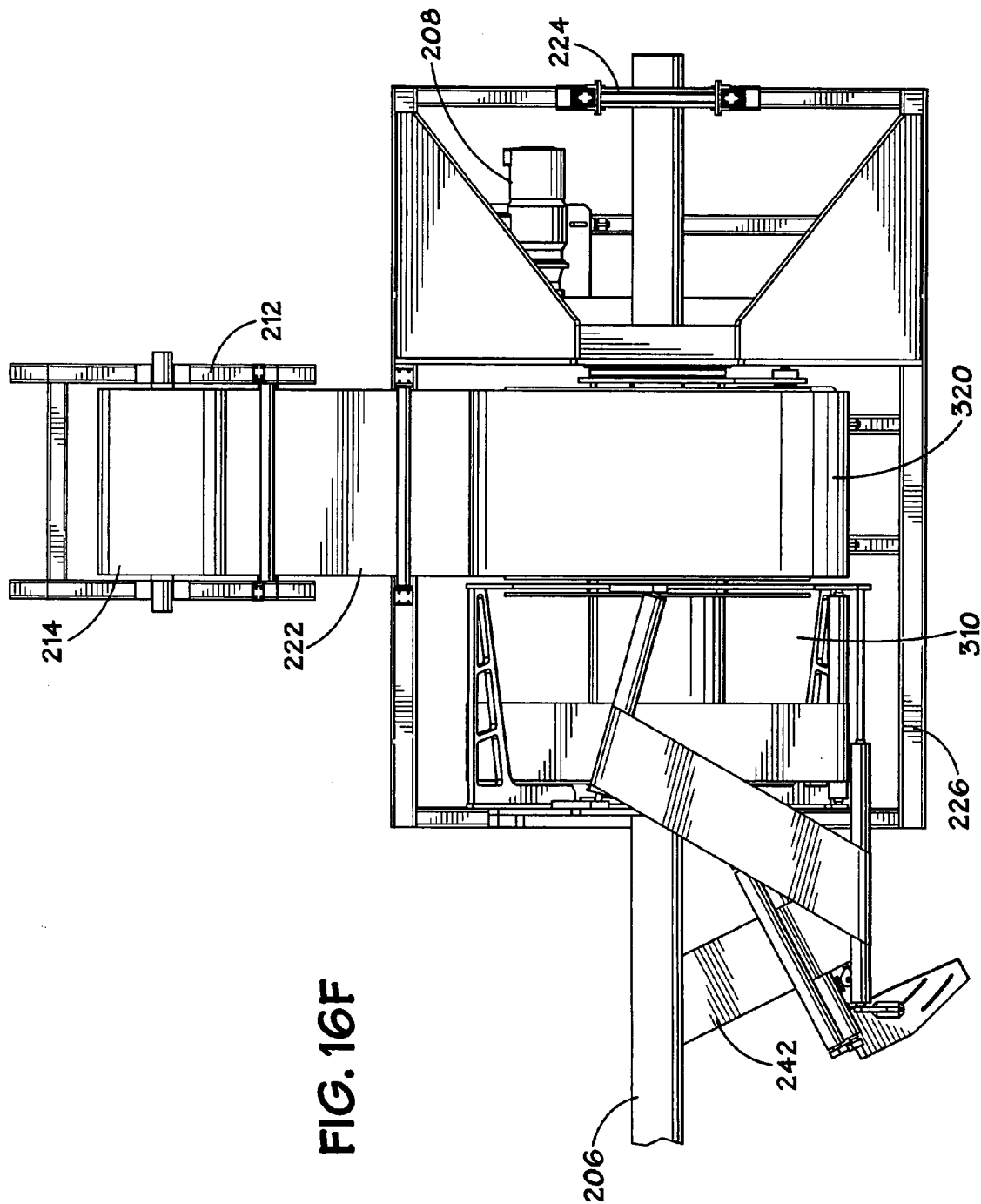

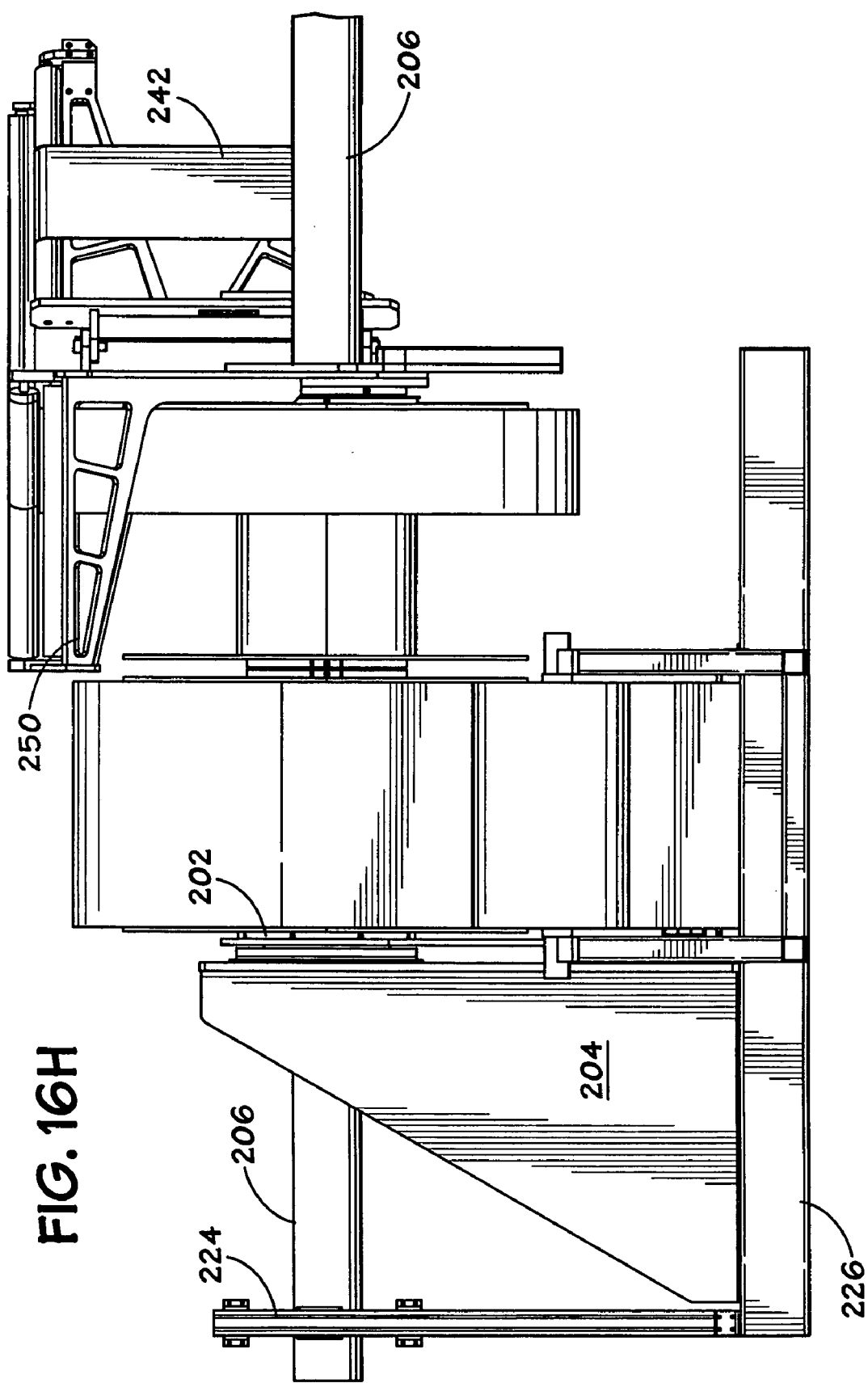

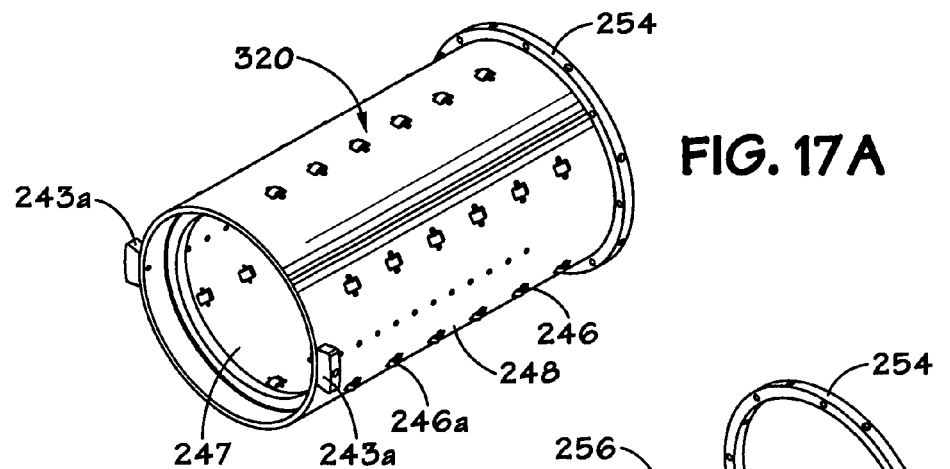
FIG. 17A
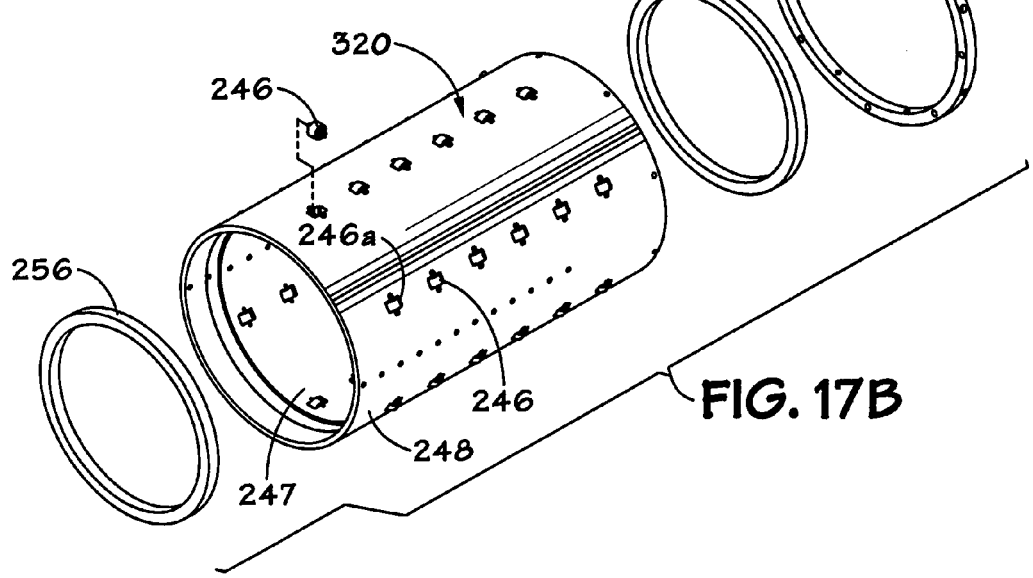
FIG. 17B
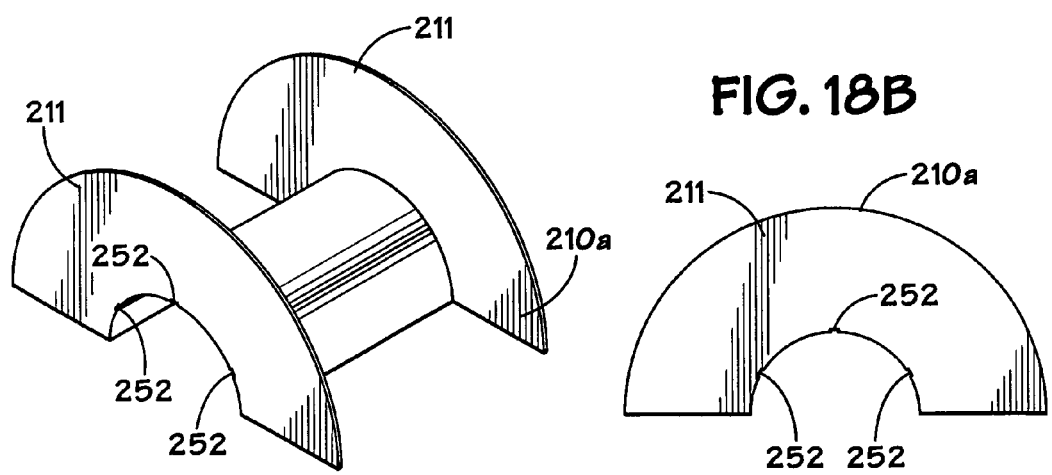
FIG. 18B
FIG. 18A

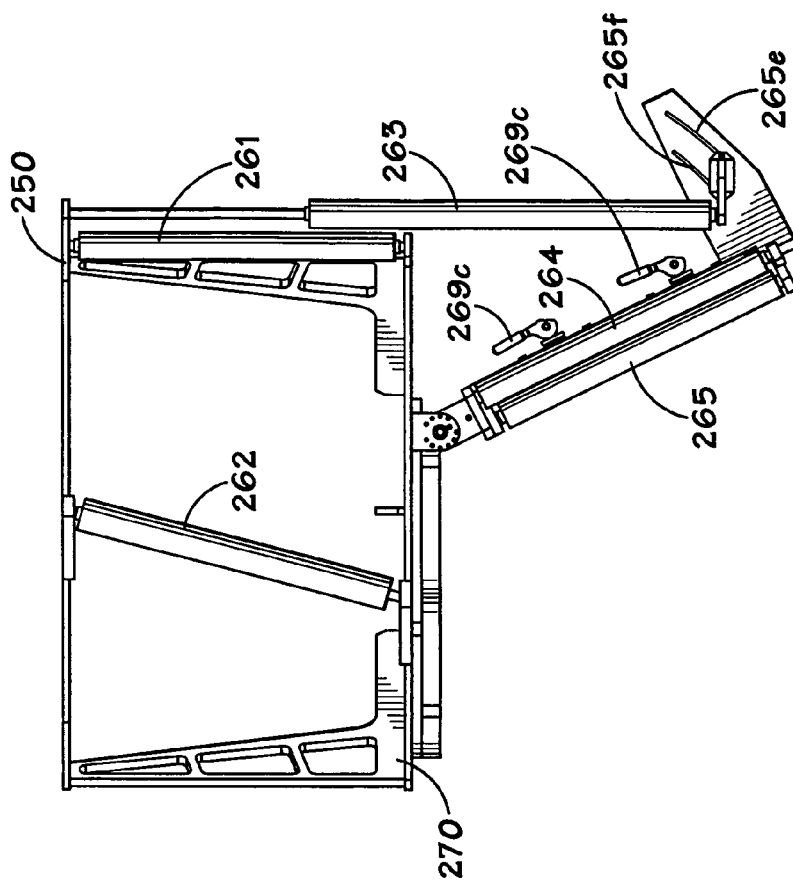
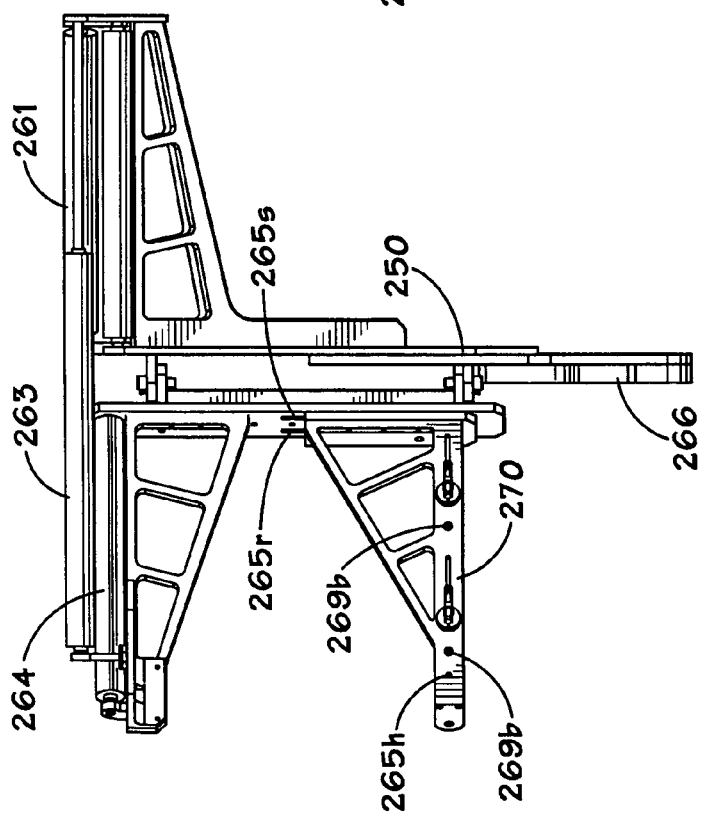
FIG.19F
FIG.19E (STEP 0: REWIND CORE EMPTY
PAYOUT CORE REMOVED)

(STEP 1: REWIND CORE FULL
PAYOUT CORE REMOVED)

(STEP 2: FULL CORE TRANSFERRED TO PAYOUT POSITION)

(STEP 3: REWIND CORE FULL PAYOUT CORE FULL)

(STEP 4: NORMAL RUNNING, REWIND CORE FULL PAYOUT CORE EMPTYING)

(STEP 5: REWIND CORE FULL PAYOUT CORE EMPTY)

(STEP 6: SPLICING NEW ROLL, REWIND CORE FULL PAYOUT CORE REMOVED)

(STEP 7: SPLICING NEW ROLL, REWIND CORE TRANSFERRED TO PAYOUT POSITION)

(STEP 8: RESUME NORMAL RUNNING, REWIND CORE FULL PAYOUT CORE EMPTYING)

SYSTEMS AND METHODS FOR MAKING PIPE LINERS

RELATED APPLICATION

This is a continuation-in-part of U.S. application Ser. No. 11/033,962 filed Jan. 12, 2005, co-owned with the present invention, fully incorporated herein for all purposes, and with respect to all of which the present invention claims priority under the Patent Laws.

BACKGROUND OF THE INVENTION

1. Field of the Invention

The present invention in certain aspects, is directed to systems and methods for making pipe liners, to lined pipe and pipelines, to pipelines with liners and fiber optic sensors, to methods for lining pipe and pipeliners, and, in certain particular aspects, to continuous reinforced thermoplastic pipe liner intended for use as a stand alone pipe liner in the restoration of degraded pipelines.

2. Description of Related Art

Pipeline and/or underground transport of liquids and gases has been utilized for many years. Such pipeline and/or underground transport has proven to be an efficient and safe manner in which to transport potentially explosive, flammable, and/or toxic liquids (e.g. crude oil) and gases (e.g. methane and propane) over long distances. One method for providing such long distance underground transport has been through metal tubes and pipes. In the past, the utilization of metals (such as steel, copper, lead, and the like) was effective from cost and raw material supply perspectives. However, with the population growing throughout the world and the necessity for transporting liquids and gases to more locations increases, the continued utilization of such metal articles has become more and more difficult for a number of reasons. Initially, the production of such metal tubes and pipes is done with high-temperature production methods at specific foundries which are often located a substantial distance from the desired installation site. Such off-site production can require transport of cumbersome metal articles to an installation location and then subsequent placement into already-dug channels. These procedures can be difficult to follow since metal articles are rather heavy and must be connected together to form the desired pipeline. Additionally, in order to reduce the number of connections between individual pipes, longer metal pipes could be formed, which adds to the complexity with an increase in required welded connections. Further problems associated with metal pipes and tubes include the potential for internal and external corrosion (which may contaminate the transported liquid or gas), the low threshold of earth-shifting resistance which could cause a break within the pipeline, and the difficulty in replacing worn out metal pipes in sections, again due to the metal pipe weight, metal pipe length, and connection welds. These problems have proven to be extremely troublesome in certain geographic areas which are susceptible to earthquakes and tremors on a regular basis. When unexpected earthquakes have occurred in the past, the metal gas and liquid pipelines have not proven to be flexible enough to withstand the shear forces applied thereto and explosions, leaks, or discontinued supplies to such areas have resulted. These metal articles have remained in use because of their ability to withstand high pressures. Furthermore, although such metal pipes are designed to withstand such high pressures (e.g. above 80 bars) once a crack develops within the actual metal pipe structure, it has been found that such cracks easily propagate and spread in size and possibly number upon the application of continued high pressure to the same weakened area. In such an instance, failure of the pipe is therefore imminent unless closure is effectuated and repairs or replacements are undertaken.

Although there is a need to produce new pipelines in various locations around the world, there is also a growing need to replace the now-deteriorating pipelines already in use. Aging pipelines have recently caused concern as to the safety of utilizing such old articles. Unexpected explosions have occurred with tragic consequences. Thorough review and replacement of some old metal pipes is thus necessary. Some of these older pipelines were constructed in what were rural areas but are now heavily populated urban areas, thus increasing the risk associated with a failure. There is a desire to completely replace old pipelines following the same exact routes. In heavily populated areas, the dig and replace method becomes extremely difficult, inconvenient and costly.

Due to the difficulties noted above, there is a need to develop pipeline materials that are safer, longer-lasting, easier-to-install, non-corroding, non-crack propagating, and more flexible. To date, there have been some thermosetting or thermoplastic articles which are designed for such applications. These include certain fiber-wound reinforcement materials (including fiberglass, poly-aramids, polyesters, polyamides, carbon fibers, and the like). However, the resultant articles do not include specific fabric reinforcements (they are fibers wound around specific layers of plastic material) and thus are difficult and rather costly to produce. Furthermore, such fiber-wound materials often cannot be easily produced at the pipe installation site due to the complexity of creating fiber-wound reinforcement articles subsequent to thermoplastic or thermosetting layer production. Additionally, with off-site production, transport and in-ground placement can be a difficult problem. Thus, although some improvements have been provided in the past in relation and in comparison to metal pipes and tubes, there simply is no viable alternative presented to date within the pertinent prior art known to the present inventor which accords the underground liquid and gas transport industry a manner of replacing or restoring such high pressure metal articles.

Pipe liners have been used in a variety of applications to stop further degradation of a pipeline due to internal corrosion, to provide improved resistance to abrasion, and to stop leakage at joints. Pipe liners are generally designed to resist only installation loadings and to serve as a pressure barrier for transported fluids operating loadings are transferred directly to the wall of, and resisted by, a host pipe that may have already exceeded its design life. Pipe liners typically do not restore the operating parameters of a pipeline. Pipe liners come in a variety of known forms. These include cured-in-place pipes ("CIPP"). The CIPP product is a fiber reinforcement that is impregnated with an un-cured thermosetting resin that is used primarily in sewer and watermain rehabilitation. The CIPP is inserted into the host pipeline and expanded into contact with the host pipe walls and then cured, often by pumping heated water through the CIPP which is reinforced by the pipeline. CIPP liners are designed to resist only the installation forces and typically do not contribute, or add significantly to, to the strength of the host pipeline. Further they generally do not provide protection against external corrosion. Examples of this type of pipeliner are disclosed in U.S. Pat. Nos. 4,064,211 and 6,708,729 (and in prior art cited therein). The use of such pipe liners is well documented in the industry literature and is not applicable to the high-pressure applications.

Another type of prior art pipe liner is the extruded thermoplastic pipe-liner. These products are continuous lengths of thermoplastic material such as HDPE (high density polyethylene), nylon, PVC (polyvinylchloride) alloys, and other such materials commonly used for piping applications and/or corrosion mitigation. These materials are sometimes used in combination, that is, multiple layers of different materials, or with discrete length fiber reinforcement, to obtain improved properties. Limitations of this type of product are that it relies on the strength of a host pipeline to resist operating stresses; it has limited tensile strength and can therefore be pulled into a host pipeline only in relatively short lengths, usually one mile or less; and it cannot provide protection against external corrosion. A further limitation of this type of product is the ability of fluids to permeate through the wall. All thermoplastics are permeable to some degree. Gases that permeate tend to be collected in a space at the pipe liner host-pipe interface where pressure can increase to a level approaching the operating pressure of the pipeline. When the pipeline pressure is suddenly reduced, the entrapped gas follows the normal gas laws and expands. Such expansion, often results in a buckling of the pipe liner called "liner collapse". As a result, pipelines with polymer pipe liners are normally equipped with "venting systems" and operational procedures are established to "vent" permeated fluids (see, e.g. U.S. Pat. No. 5,072,622 which describes a method for removal of such gases before they are able to collapse a pipe liner). Methods developed to install thermoplastic pipe liners include swage-lining, the use of sized rollers and liner tension to reduce the pipe liner diameter (see, e.g. U.S. Pat. No. 6,240,612), and the "fold and form" method in which the round liner is folded into a "C," "H," "W," "U" or other shape for insertion (see, e.g. U.S. Pat. Nos. 4,863,365; 4,985,196; 4,998,871 and 6,058,978). Applications involving the use of such pipe liners are well documented in the industry literature.

Another well-known pipe liner product and method for rehabilitation of pipelines is the flexible yet rigid spoolable composite pipe member which can be pulled or otherwise inserted into a host pipe. The spoolable composite pipe is of significantly smaller diameter than the host pipe to allow it to be installed. This pipe and method of installation can provide increased pipeline pressure rating and increased internal and external corrosion resistance, but can result in a significant reduction in the effective inside diameter of the host pipe. This results in an increase in pipeline operating costs. An additional significant limitation of this product is the difficulty of road transport of rigid spoolable pipe sizes greater than about four inches in diameter in sufficient continuous length to be cost effective (see, e.g. U.S. Pat. Nos. 3,769,127; 4,053,343, 5,755,266; 5,828,003 and 6,065, 540).

Another well-known documented pipe liner product and method for the rehabilitation of pipelines is reinforced thermoplastic pipe which can be inserted or otherwise pulled into a host pipe. This product typically consists of an extruded thermoplastic liner that is reinforced by fiber or tapes which are protected by a cover. This relatively flexible, yet rigid, pipe and method can provide increased pipeline pressure rating and increased internal and external corrosion resistance, but can result in a significant reduction in the effective inside diameter of the host pipe, and in increased pipeline operating costs. Another limitation of this method is the difficulty of road transport of rigid pipe sizes greater than about four inches in diameter in sufficient continuous length to be cost effective (see, e.g. U.S. Pat. Nos. 2,502,638; 4,000,759; 4,384,595; 5,072,622; and 6,305,423).

Wound-fiber reinforced plastic pipe is commonly available in a variety of forms, including discrete length products in which a specific length of pie, e.g. 30-feet, is produced and continuous length products, often referred to as "Spoolable Composite Pipe" or "SCP." One common type of SCP utilizes a polymer liner or core pipe reinforced by layers of wound-fibers in a polymer matrix, e.g. epoxy or polyester, see, e.g. U.S. Pat. Nos. 6,782,932, 5,933,945, 5,921,285, 4,384,595, 4,142,352 and 4,120,324. Another common type of SCP has a polymer liner or core pipe reinforced by wound-tapes or fibers using an orbital process in which material is pulled from bobbins or rolls that orbit a polymer liner as it translates through the apparatus; see, e.g. U.S. Pat. Nos. 2,502,638, 3,616,072 4,259,139 and 4,495,018 and U.S. Patent Application Pub. No. 20040144440, U.S. Pat. No. 351,350 filed Jan. 27, 2003.

SUMMARY OF THE PRESENT INVENTION

The present invention, in at least certain embodiments, discloses pipe liners, methods to make them, methods to install them, and lined pipe or pipelines with a multi-component liner and, in one aspect, a fiber optic sensor system and/or a communications system, e.g. a fiber optic communications system.

Certain pipe liners produced in accordance with certain embodiments of the present invention are a stand-alone structure which is capable of withstanding operating and installation loadings and, optionally, with embedded measurement and redundant sensing devices for monitoring the integrity of a restored pipeline on a continuous basis. The present invention also discloses lined pipe and pipelines with the capability for communications/control through a communication system, e.g. a fiber optic communication system with fiber optic cables and/or apparatus, in one aspect with collection and removal apparatus of any permeated fluids. In certain particular aspects, the present invention discloses pipelines (e.g. relatively large diameter degraded pipelines) which are restored to original or near-original specification without digging and without replacement.

The present invention discloses, in at least certain aspects, a light-weight high-strength yet flexible multi-component pipe liner structure that can be installed as a stand-alone pipe liner restoring a pipe or a host pipeline to (or near) its original performance parameters and original service life, while providing increased internal and external corrosion protection and increased protection from damage, e.g. during earthquakes, accidents, and acts of terrorism. In certain aspects, a "stand-alone" pipe liner as used herein is a pipe liner that withstands all (or substantially all) installation and operational loads without assistance.

The present invention discloses, in at least certain aspects, a liner with sufficient axial strength to allow for the lining of existing pipelines with lengths in excess of several miles (e.g. in excess of five miles or in excess of ten miles), in one aspect with single pull installation.

The present invention discloses, in at least certain aspects, apparatus and structure within a pipe or pipeline for collecting and handling permeated fluids, especially gases, that might otherwise cause the pressure barrier to collapse when pipeline pressure is reduced (and, in some cases, suddenly reduced).

The present invention discloses, in at least certain aspects, a method for continuous measuring and monitoring of the integrity of a pipeline.

The present invention discloses, in at least certain aspects, apparatus and systems for the remote operation of pipeline apparatuses, pipeline control devices, and control valves.

In certain aspects, the present invention discloses a stand-alone reinforced thermoplastic pipe liner of continuous length with: a layer of polymeric material; two or more layers of fabric reinforcement material; an axial strengthener [e.g. axial tapes (in one aspect, fiber tapes) or socks, or flattened tubes, e.g., in certain aspects, made from carbon fiber based material, or any suitable high strength fiber or material disclosed herein] for pulling and increasing strength; orbitally wound fibers to lock the tapes in relationship to the fabric reinforcement; optionally, one or a series of fiber optic cables; and, optionally such cables covered by a protective layer, e.g. a protective polymer layer, which, in certain aspects mitigates installation damage and provides structure for collecting and removing permeated fluids. Optionally a liner according to the present invention includes a thin layer of thermoplastic film interiorly of the polymeric cover and/or on the or an outermost layer of fabric reinforcement material (e.g., but not limited to SARAN™ material). In certain aspects a pipe liner according to the present invention is designed for long term service (fifty years or more) at maximum allowable operating pressures up to 2,000 psi (136 bar) with safety factors in the range from 2.8 to 3.8 against Short Term Burst.

In one particular aspect a first layer of a pipe liner according to the present invention is a first polymeric layer which is an extruded cylindrical thermoplastic or modified thermosetting resin material, such as polyolefin, polyamides, polyvinyl chlorides and alloys thereof, HDPE and polymeric materials that have sufficient resistance to chemical attack and strength to be used in applications involving the transport of hydrocarbons and water. Such materials are readily available worldwide and have had extensive usage in the transportation of natural gas, hydrocarbons and water. An extruded cylinder is produced in long, yet transportable, lengths for ease of inspection and transport to the fabrication site. These discrete length cylinders of polymeric material are welded together, e.g. butt fusion welded, to form a continuous-length inner pressure barrier for the pipe-liner. The weld is accomplished using existing technology in conjunction with, preferably, rapid cooling techniques, to increase the process speed. Both the external and internal weld beads are, optionally, removed during the process and each weld is subjected to a 100% volummetric non-destructive integrity test.

Application of internal pressures to the non-reinforced cylinder results in an expansion of the diameter thereby thinning the wall thickness to the point of breaking, or the pressure is discontinued. Extruded thermoplastic pipe liners used in the past have relied upon the wall thickness of the host pipe to restrict expansion and support the applied pressure without damaging the pipe liner. Development of reinforced plastic pipe has shown that reinforcement applied over the extruded liner allows the pipe to resist higher pressures. In certain aspects of a liner according to the present invention, the first polymeric layer has a ratio of cylinder outside diameter to wall thickness, sometimes referred to as the Standard Dimensional Ratio ("SDR"), within the range from 26 to 36. This ratio allows handling of the cylinder without buckling while enhancing the desired flexibility of the pipe liner.

Reinforcement added to the first layer cylinder of the pipe liner is two or at least two layers of fabric (preferably, but not necessarily, unidirectional fabric) applied under tension and, in one aspect, at essentially equal but opposite angles (that is, plus and minus the same angle, with respect to the pipe liner axis). In certain aspects, each layer of reinforcement of the pipe liner is a single width of fabric. Each width of fabric can have several individual thicknesses of reinforcement material. In certain aspects the material used is one of several advanced reinforcement fiber materials commonly referred to as "ballistic materials" or "extended chain polyethylene ballistic material". This material is light weight, exhibits high specific strength, high specific stiffness, low elongation or stretch, and is similar, in some aspects, to the inner liner material.

In certain aspects, the width of the fabric is determined by the relationship:

Coverage=width $(N)/(\pi)$(Outside Diameter)(cosine $\phi$)

(where $\phi$ is the fabric winding angle)
(N=number of layers;
N=1 for one layer)

For example, in one particular case:

Coverage=width/$\pi D$ Cos $\phi$

For 100% coverage: Coverage—1.00 and Cos $\phi$=width/$\pi D$ e.g. for a pipe liner with
D=4.500 inches and
Width=8.00 inches,
then Cos $\phi$=8/(3.1416)(4.500)=0.5659 and $\phi$=55.53°

For certain aspects of the present invention, the desired coverage is 100 percent and the nominal value of $\phi$ ranges between 50 and 85 degrees, e.g., in one aspect, 54.7 degrees. The outside diameter of the pipe liner increases with each reinforcement layer resulting in a required increase in the fabric width for each layer. With multiple fabric layers with relatively smaller widths, 100% coverage can still be achieved. (In the above example, using two layers—N=2—and fabric width of 4.0 inches, the same coverage is achieved. For certain aspects of the present invention, the angle $\phi$ may be adjusted slightly to produce 100 percent coverage using a single fabric width. In one aspect a thin polyolefin liner (e.g. a layer 10 as described below) resists pressure until the reinforcement becomes loaded and the further increase in pressure is transferred to the reinforcement. This transfer in loading appears to take place at approximately one third of the maximum allowable operating pressure.

Because the materials of construction may have extremely low coefficients of friction, the first reinforcement layer is, optionally, locally bonded to the inner liner and the reinforcement layer(s) are bonded to each other, e.g. using any suitable adhesive, e.g. a glue or rapidly curing adhesive and/or tape. Bonding takes place at one, two, three, four or more independent narrow axial strips (or intermittent amounts of glue or adhesive) equally spaced on the circumference of the substrate. In certain aspects the total width of the axial strips makes up no more than 10% of the circumference of the inner liner (first layer cylinder). The limited bonding is used to maintain the flexibility of the pipe-liner while holding the reinforcements in place during subsequent manufacturing operations and installation.

To permit long lengths of the inventive pipe liner to be installed using a single pull, in certain aspects, one or a plurality, e.g. between 2 and 8 tapes, socks, or tubes (e.g.

carbon fiber tape) are spaced around and on top of the fabric reinforcement and bonded to the surface, e.g. using a rapidly curing adhesive. A second set or layer (and in one aspect a third) of tapes may, optionally, be installed on top of the first. The actual number of tapes will vary depending upon the pipe liner diameter and desired tensile strength. In certain aspects, the tape used is a near 100% unidirectional fiber tape produced from high-modulus high-strength carbon fibers. In certain aspects relatively stiff fiber tape is used with a matrix material (e.g. epoxy or similar material). In certain aspects no matrix or filler material is used and the tapes are soft and flexible. In certain aspects, fiber bundles or tows range from 12,000 to 50,000 filaments and multiple tows are used. The fibers may be stitched together. Each of the pulling tapes is laid on the pipe, e.g. in a substantially axial or zero degree position with respect to the axis of the pipe liner. In certain aspects, the actual angle with respect to the axis will be in the range from 0 to 10 degrees. In one aspect, the pulling tapes are configured and located so that, when a completed liner is folded, e.g. into a "C" shape, for insertion into a pipe, the pulling tapes help maintain the liner in the "C" shape during such insertion.

In one embodiment, with the tapes installed, high strength ballistic material fiber tows are orbitally wound on top of the tapes to secure them in place. This over-wrapping need not provide 100% coverage. In certain aspects, the angle of the tows is ±54.7° nominally and in the range of 50° to 80°. Fiber tows are used to help fix the fiber tapes' relationship with the reinforcement and ensure that the low coefficient of the ballistic fiber fabric and tape will not permit relative movement between the two. Fixing the relationship between the reinforcement fabric and the carbon fiber tapes (or socks or tubes) insures that both materials strain at the same or substantially the same rate, provides additional tensile strength for pulling, and allows greater hoop loading of the fabric.

With the reinforcement in place, components of a continuous measuring, monitoring and communications systems are, optionally, bonded to the pipe surface. This system is intended, in certain aspects, to allow monitoring on a continuous or intermittent basis as determined by the pipeline operator. The system is a fiber optics system. In certain aspects this system is attached to the pipe as a continuous thermoplastic tape, with each tape including two fiber optic cables (one for temperature, one for strain) or four fiber optic cables (two plus two additional cables for redundancy). One half of the fiber optic cables are further enclosed within a tubular void space into which the cables are placed. The other half is embedded within the thermoplastic material. The monitoring system, in one aspect, has a minimum of one such tape and, in one aspect, has at least two such tapes located at 90° to each other and placed on the pipe axially and/or helically. The fiber optic cables enclosed within the tube are designed to allow distributed temperature measurement over great distances. Only one fiber optic cable is required for temperature measurement, the other(s) are redundant and can be used to replace a damaged cable if and when necessary. In one aspect, the fiber optic sensors will respond to localized changes in temperature with an accuracy of about 4° F. and locate the position of the temperature anomaly within about six feet. Changes in temperature reflect a leak or impending leak. The half of the fiber optic sensor(s) embedded within the thermoplastic tape is used to measure localized strains along the length of the pipe. Again, only a single fiber optic cable is required for this measurement, the others are provided for redundancy. The strain sensor, in one aspect, is embedded in the tape which is anchored to the pipe liner wall. Changes in strain level of the pipe liner are measured to an accuracy of about 20 microstrain ($\mu\epsilon$) and the position of the anomaly is located within a small range, e.g. within about six feet. The data from this sensor, correlated with long term test data (e.g. from regression analysis, e.g. from an ASTM D 2992 test, allows a determination of the integrity of the pipe liner on a continuous basis and further allows corrective action to be taken before a failure or incident occurs.

In addition to the monitoring system, additional fiber optic cables can be provided, according to the present invention, for use in a communications and control system. These fiber optic cables can be included within the tapes mentioned or within separate tapes. Such a system with these fiber optic cables provides a communications and control function to be used to interface with a control/monitor system, remote or on-site, e.g. a pipeline supervisory control and data acquisition ("SCADA") system and to operate pipeline devices and controllers. Pipeline valves, external to a pipe liner according to the present invention, can be controlled using these cables. In one aspect, the sensors and communications lines are integrated through an existing operating system to provide for control, indications of potential problems, automatic alarms and/or shut down of the pipeline or of apparatuses thereon.

The monitoring system package and reinforcement is, optionally, protected by a polymeric cover or jacket that, in one aspect, is formed from a sheet of material whose width is approximately the same as the circumference of a reinforced pipe liner made, e.g. of polyolefin, nylon, polyvinyl chloride (PVC), high density polyethylene and the like. The sheet, in one aspect, is rolled to form a continuous cylinder that fits tightly around the pipe and is welded to itself to prevent incursion of external debris and or fluids. The cover is on top of the fiber optic packages to protect them from wear and handling damage during folding and pulling into the host pipe. Alternatively a cover is made by coating the structure with a layer of plastic or similar material, e.g., but not limited to, polyurethane, e.g. polyurethane S-355 from IR Products. Such material may be sprayed on, extruded on with a crosshead extruder, or painted on.

This placement results in an annular space between the pipe reinforcement and the inside of the cover sheet due to the presence therebetween of the fiber optic sensors. Spacers are, optionally, placed between the sensor tapes as necessary to support the cover (e.g., separate spacers made of plastic, wood, extruded thermoplastic or thermosetting material or spacers that are integral to a cover). Additionally, in certain aspects, these spacers are, optionally, shaped to permit the accumulation of permeated fluids from the flowing fluid to be vacuumed at an external vent port so there is no accumulation of pressure that might result in damage to the pipe liner. Monitoring the amount of fluid removed and/or pressure relieved provides an additional indication of the integrity of the pipe liner.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 16D is an enlarged view of part of the system of FIG. 16A.

FIG. 16F is a top view of part of the system of FIG. 16A.

FIG. 16H is a second side view of part of the system of FIG. 16A.

FIG. 17A is a perspective view of a concentric shaft of the system of FIG. 16A.

FIG. 17B is a perspective exploded view of the concentric a shaft of FIG. 17A.

FIG. 18A is a perspective view of a split core of the system of FIG. 16A.

FIG. 18B is a front view of the split core of FIG. 18A.

FIG. 19E is a second side view of the assembly of FIG. 19A.

FIG. 19F is a top view of the assembly of FIG. 19A.

FIG. 21I is a perspective view of part of the system of FIG. 16A showing a step in its operation.

DESCRIPTION OF EMBODIMENTS PREFERRED AT THE TIME OF FILING FOR THIS PATENT

Figure 1:
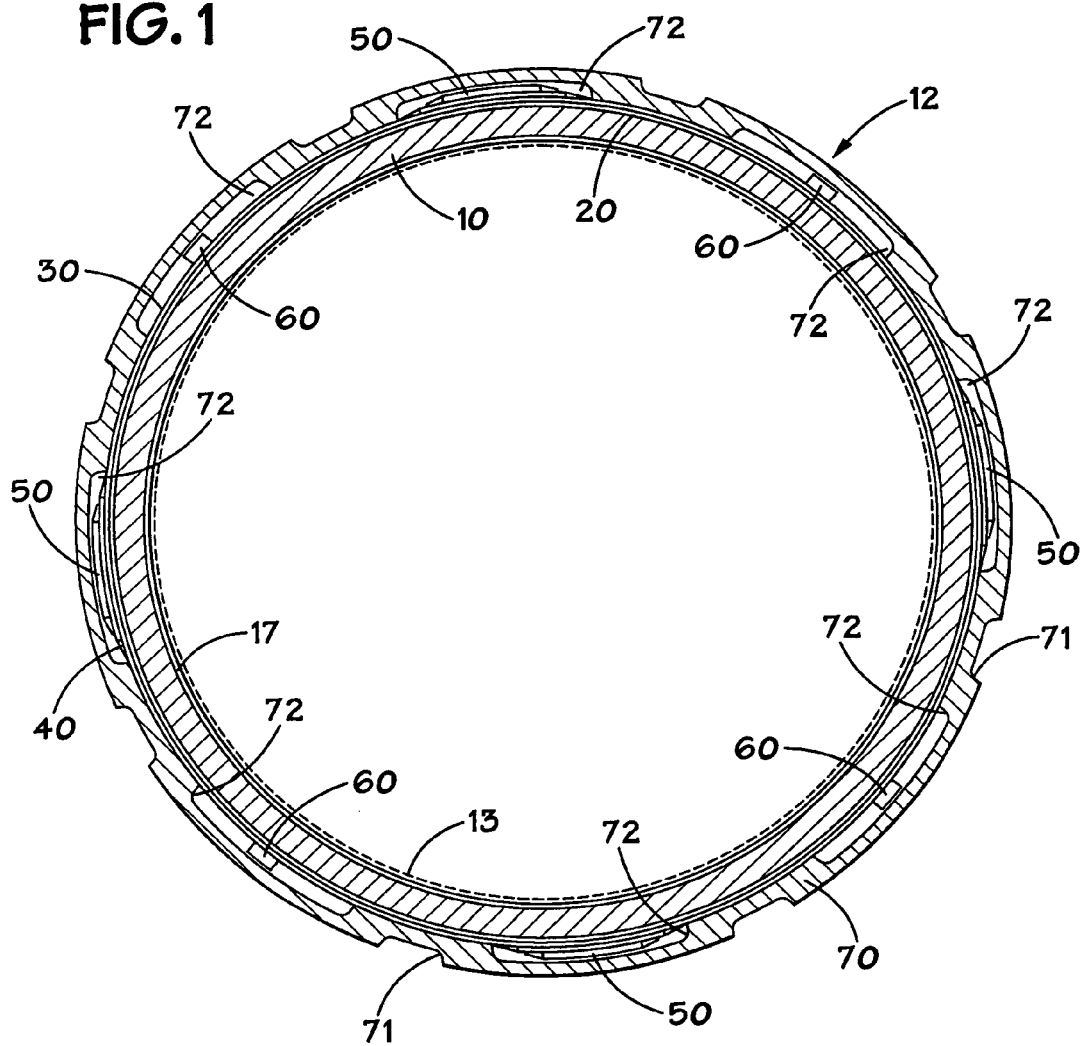
FIG. 1 is a cross-section view of a liner according to the present invention.

A pipe liner 12 according to the present invention as shown in FIG. 1 has an innermost first layer 10 (which when formed is a hollow cylinder, in one aspect, a deformable/re-formable cylinder), a second layer 20, a third layer 30, fiber strands 40, spacers 50, fiber optic cables 60, and a cover 70.

Figure 2:
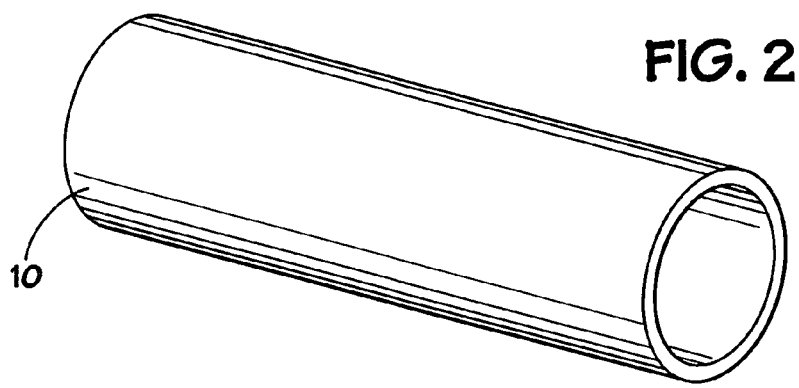
FIGS. 2-5 are side views of components of the liner of FIG. 1.

As shown in FIGS. 1 and 2, the first layer 10 is a generally cylindrical member made of flexible material sufficiently strong to support the other layers and components and sufficiently flexible to be compressed, deformed, and re-formed. In one particular aspect the first layer 10 is extruded HDPE (e.g. any suitable grade; e.g. PE 3408, PE 100), with an outside-diameter-to wall-thickness ratio SDR of about 32.5 in hollow cylindrical form. In certain aspects the lined pipe is between 4" and 30" in O.D. and, in other aspects, the pipe that is lined is standard size (iron pipe size or IPS) and has an O.D. between 6⅝" and 16". In one particular aspect, fifty foot lengths of such first layers are commercially available. In certain aspects a fluid-resistant thermoplastic material is used for the first layer that resists fluids being transported through a pipeline or pipe. NYLON 6 (Trademark) material, RILSAN (Trademark) material, or NYLON 11 (Trademark) material or other suitable thermoplastic material may be used for the first layer.

In certain embodiments, lengths of the first layer 10 are welded together on-site at a location at which the liner 12 is to be installed within a pipe or pipeline. In one aspect the lengths of the first layer 10 are butt fusion welded and while the welds are still hot weld beads are smoothed out and/or removed both inside and outside the layer 10. Optionally, the welded area is tested on-site for integrity, e.g., but not limited to, with known ultrasonic testing apparatus.

Figure 3:
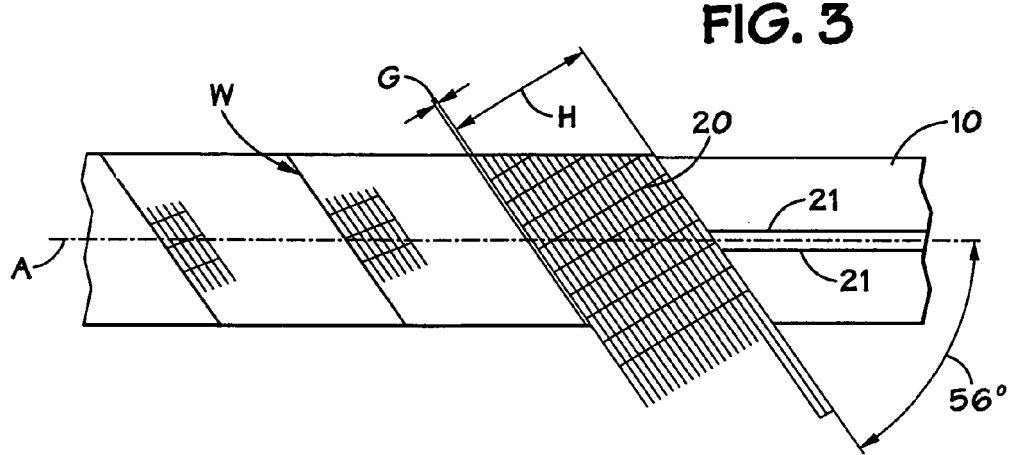

As shown in FIGS. 1 and 3, the first layer 10 is wrapped with the second layer 20 which is a layer of material for strengthening the liner 12. Suitable materials for the second layer 20 include fabric with highly oriented HMPE fibers ("HMPE": high molecular weight polyethylene); or ultra high molecular weight Polyethylene ("UHMPE"); SPECTRA (Trademark) material; KEVLAR (Trademark) material; ARAMID (Trademark) material; VECTRAN (Trademark) material; liquid crystal polymer ("LCP") material; DYNEEMA (Trademark) material; TWARON (Trademark) material; TECHNORA (Trademark) material; fiber-reinforcing material, e.g. carbon fibers, fiberglass fibers and/or hybrid fibers; fabric made from carbon fibers and/or glass fibers; and fabric made from carbon fibers and SPECTRA (Trademark) fibers. In certain particular aspects, SPECTRA (Trademark) material, commercially available from Honeywell Company is used because it has a weight-to-volume ratio of 0.035 lbs/in$^3$. In certain particular aspects, commercially available para-aramid material is used which has a weight-to-volume ratio of 0.051 lbs/in$^3$. In certain particular aspects, commercially available carbon-fiber reinforced material is used which has a weight-to-volume ratio of 0.051 lbs/in$^3$. The thickness of layers 20 and 30, in certain aspects, ranges between 0.010 and 0.240 inches and in one particular aspect is 0.024 inches. In one aspect the layer 20 and/or the layer 30 are highly oriented high molecular weight polyethylene ("HMWPE").

The second layer 20 is wrapped around the first layer 10, in certain aspects at a wrap angle (or wind angle) between 45 degrees and 85 degrees. In other aspects this wrap angle is between 50 degrees and 60 degrees and, in one particular aspect, this angle is 54.7 degrees. As shown in FIG. 3, the wind angle is designated "plus" to indicate its orientation with respect to a longitudinal axis A of the layer 10 and the wind angle is 56 degrees. Edges of each wrap are butted up against edges of adjacent wraps so no part of the second layer overlaps itself (see, e.g. butting up indicated by arrow W, FIG. 3). Alternatively, a minimal overlap is used; or there is a gap G as shown in FIG. 3. Each wrap of the layer 20 has a width H). Optionally, one, two, three, four, five, six, seven, eight or more tapes, strips, or lines of adhesive or glue 21 are applied on the liner 10. It is to be understood that the entire layer 20 can, according to the present invention, be wrapped around the layer 10 with no gap between wrap edges; with an overlap of some edges; with a gap between all adjacent wrap edges; or with a combination of gap between some edges, overlap of some edges, and/or no gap between others. In certain aspects in which the layer 20 (and/or the layer 30 discussed below) have unidirectional (oriented at the same angle or in the same direction) fibers, the layer 20 is applied so that the fibers are oriented generally at an angle to the longitudinal axis A, in one aspect, at the same angle as the wind angle. By employing no such overlap, overall effective diameter of the liner 12 is reduced. Alternatively, the second layer 20 is wrapped with space between adjacent wrap edges, rather than butting edges against each other which also results in no overlap. In some such aspects, space between adjacent wrap edges is no more than 3% of the total liner surface area.

Figure 6:
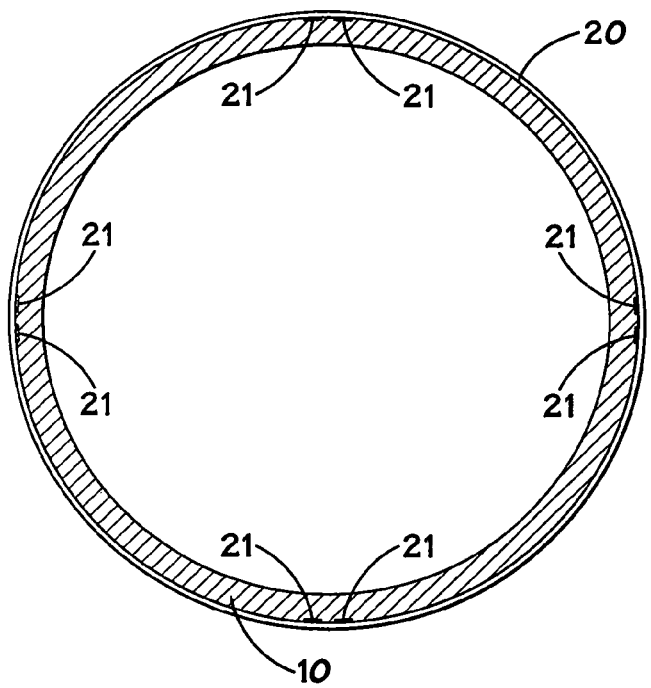
FIGS. 6, 7, 7A, 8, 9, 12, and 14 are cross-sections views of components of a liner as in FIG. 5.

Optionally, as shown in FIGS. 3 and 6, one or more lines or strips of glue, adhesive, or tape 21 may be applied to the first layer 10, either intermittently or from one end of the first layer 10 to the other, either in straight lines (as shown) or wrapped around the first layer 10, to inhibit or prevent slippage of the second layer 20 on the first layer 10. In an embodiment in which SPECTRA (Trademark) fiber material is used with axial carbon fibers, these lines 21 tie the axial carbon fibers to the SPECTRA (Trademark) fibers so the two function at the same strain rate which allows the carbon fibers to strengthen the fabric. In certain aspects a commercially available modified cyanoacrylate type of glue is used, from Loctite Company for the lines 21. As shown in FIG. 6, eight lines 21 are used; but any desired number (e.g. 1, 2, 3, 5, 10, etc.) may be used. In one aspect the lines 21 are sprayed on. In certain aspects the lines 21 (and 31) are applied so that the liner 12 is still sufficiently flexible that it can be deformed and re-formed as desired. In one aspect two, three, four, five or more pairs of two lines are used spaced apart around the circumference. In certain aspects the tape(s) 21 are applied by wrapping machine(s), which in one aspect, are concentric wrapping machines and, alternatively, may be orbital wrapping machines. In certain aspects with relatively large diameter tubulars, multiple machines are used to apply multiple tapes side-by-side, to form one layer.

Figure 4:
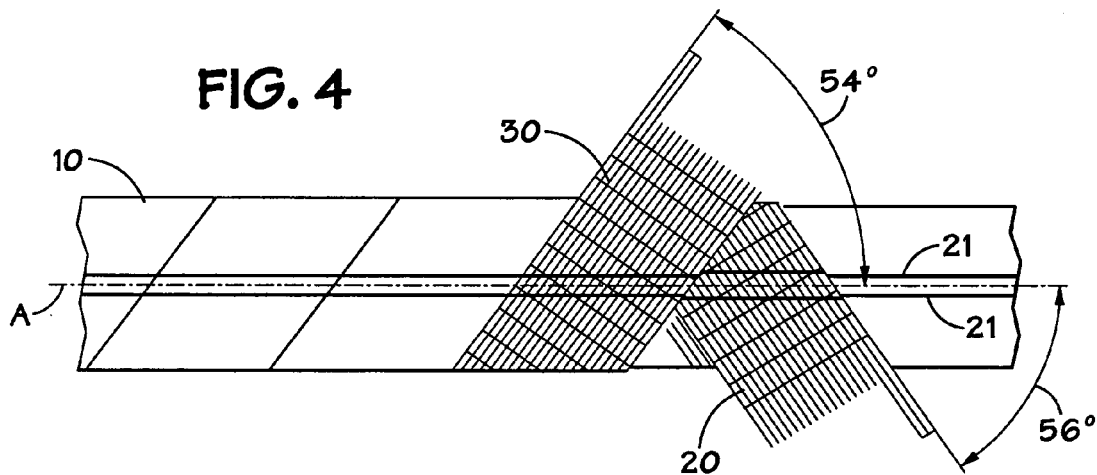
Figure 7A:
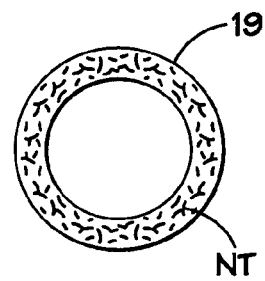
Figure 7:
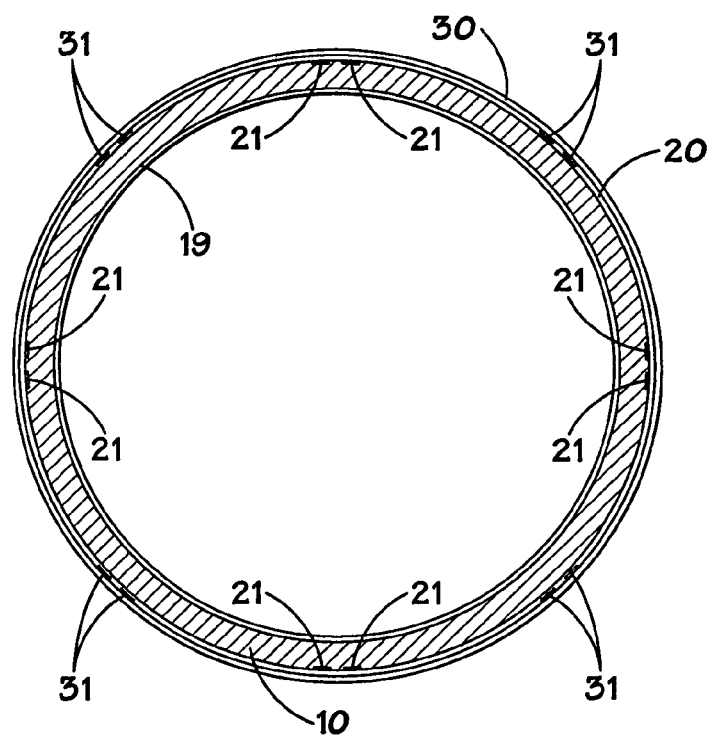

As shown in FIGS. 1, 4 and 7 the third layer 30 is wrapped over the second layer 20 and may be wrapped in any of the ways described for the second layer 20 and may be material as described for the second layer 20, with or without lines, etc. 21 on the layer 20 as described for the layer 10. In one aspect both the second layer 20 and the third layer 30 are SPECTRA (Trademark) material about 0.024 inches thick. In certain aspects the third layer 30, as shown in FIG. 4, is wrapped at a wrap angle opposite to that of the second layer 20 (designated "minus" to illustrate its orientation with respect to the axis A and in a direction opposite to that of the layer 20; and, as shown at a wind or wrap angle of minus 54 degrees). Also, as shown in FIG. 7 (not to scale) in an end view, lines 31 (like the lines 21) may be used between the second layer 20 and the third layer 30.

Figure 5:
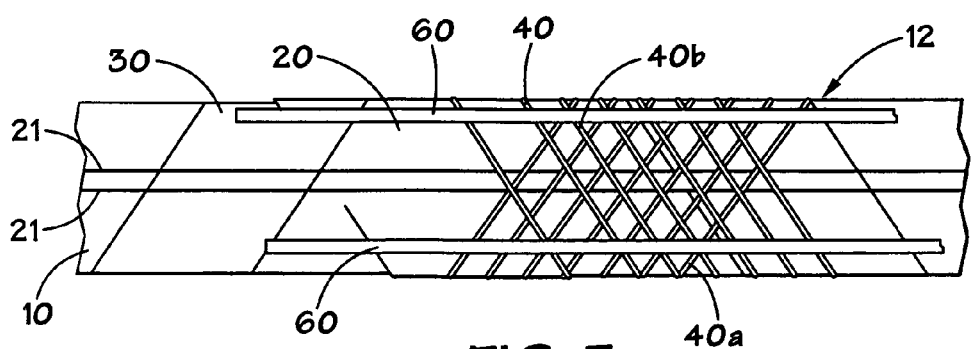
Figure 8:
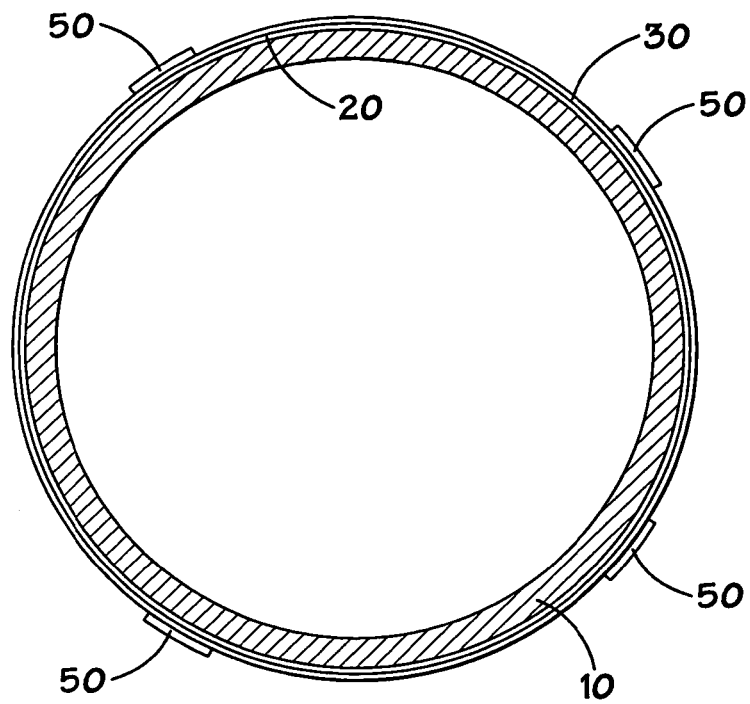

As shown in FIGS. 1, 5 and 8 one, two, three, four, five twenty, thirty, thirty six, forty or more fiber strands (or "tows") 40 are used, e.g. wound on the third layer 30 (and/or on the layer 20 and/or on the tapes 50) to strengthen the liner 12 and to facilitate its integrity while it is being pulled into a pipeline. Any suitable fiber may be used. It is within the scope of the present invention to apply strands or tows 40 at different wind angles on a liner 12. Strands 40a are at a plus wind angle and strands 40b are at a negative wind angle.

In certain particular aspects the strands 40 are commercially available fiber tows, which are wound on the liner 12. With the fibers 40 glued or otherwise adhered in place, the fibers 40 and the remaining components form a single integral body which can react to and withstand strain so that creep (undesired movement) of the third layer 30 is reduced and axial loads on the liner 12 are partially absorbed by the tapes 50 thereby reducing strain on the other layers.

Figure 9:
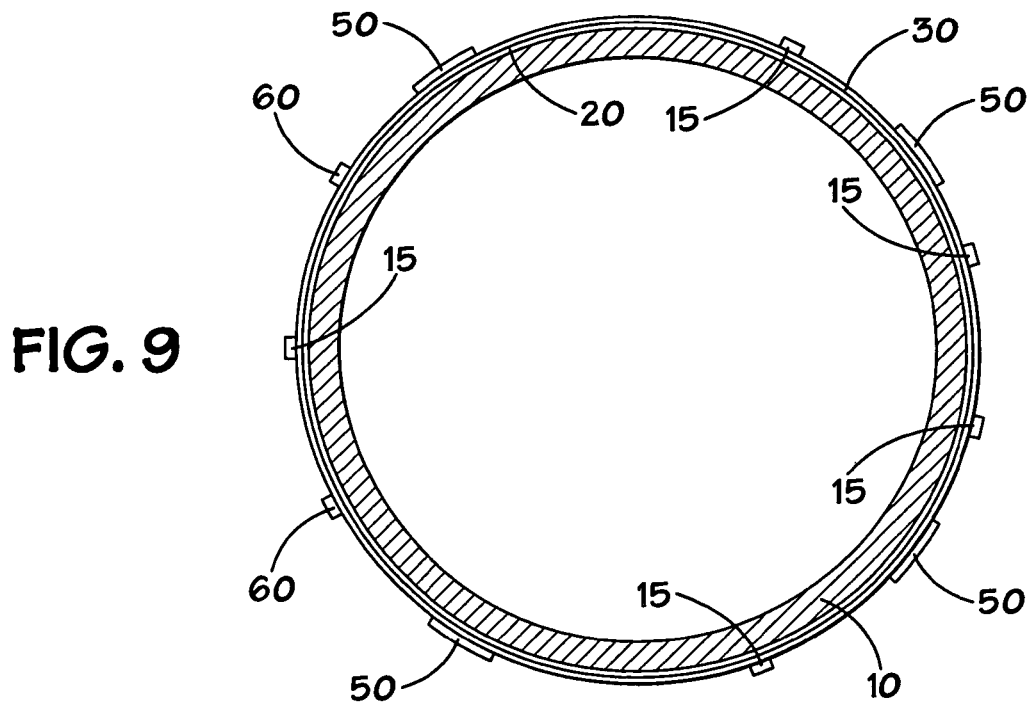

Optionally, as shown in FIGS. 1, 5 and 8, tapes 50 (or socks or tubes) (or stacks of two, three or more tapes 50) may be applied to the third layer 30. Optionally, one or some strands 40 are applied over the layer 20, over the layer 30, and/or over the tapes 50. The strands 40 when used over the tapes 50 tie the tapes 50 to the lower layers. In one particular aspect a first tape or first tapes 50 are applied on the layer 30 then a layer of strands 40 (described below) ties the tapes 50 in place. Then one or more additional tapes 50 is applied over the strands 40 and additional (one or more) strands 40 tie the additional tapes 50 in place. These tapes 50 also enhance the ability of the liner 12 to be pulled into a pipeline. In one particular aspect the tape 50 is carbon fiber tape, about 1.50 inches wide, about 0.040 inches thick, and eight such tapes 50 are used equally spaced around the circumference of the liner and extending in straight lines from one end thereof to the other (or 4 pairs of 2 tapes stacked one on the other are used). The tapes 50 (and the fibers 40) can be equally spaced around the liner circumference or not; e.g. FIGS. 8 and 9 show a cross-section view with particular spacing for the tapes 50. The spacing for the tapes 50 as shown in FIG. 9 facilitates the maintenance of a folded liner 12 (insertable into a pipe or pipe line) in a general "C" shape as described below (see FIG. 14).

Figure 10:
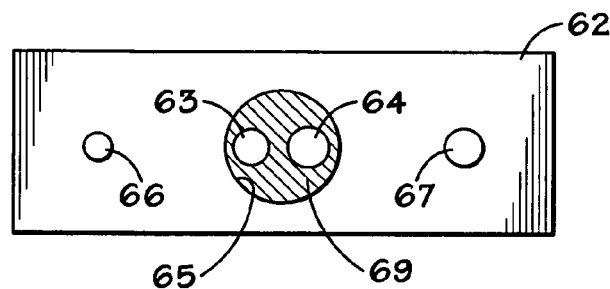
FIG. 10 is a cross-section view of a prior art fiber optic cable.

As shown in FIGS. 1 and 9, fiber optic cables 60 (one, two, three, four, five, six, or more) are applied on the fibers 40. It is within the scope of the present invention to apply the fiber optic cable(s) to the layers 10, 20, and/or 30 and/or on the tapes 50 and/or beneath a cover like the cover 70. Any known suitable fiber optic cables may be used, including SmartProfile (Trademark) cables from Smartec S/A Company. In one particular aspect a SmartProfile (Trademark) fiber optic cable 61 is used as shown in FIG. 10 which has a body 62, e.g. made of HDPE which encases one or at least two fiber optic cables 63, 64 in filler material 69 within a central space 65 and two additional fiber optic cables 66, 67. Either or both of the cables 63, 64 is used to measure temperature on the liner 12 and either or both of the cables 66, 67 are used to measure strain. The temperature measurements provide information regarding leaks in the liner 12 both regarding the existence of a leak and its location (temperature and strain measurements are done in prior art systems with cables on the outside of a pipe, e.g. a steel pipe). Either cable 63 or 64 may be deleted; but providing two such cables provides redundancy in the event one of them fails.

Figure 11A:
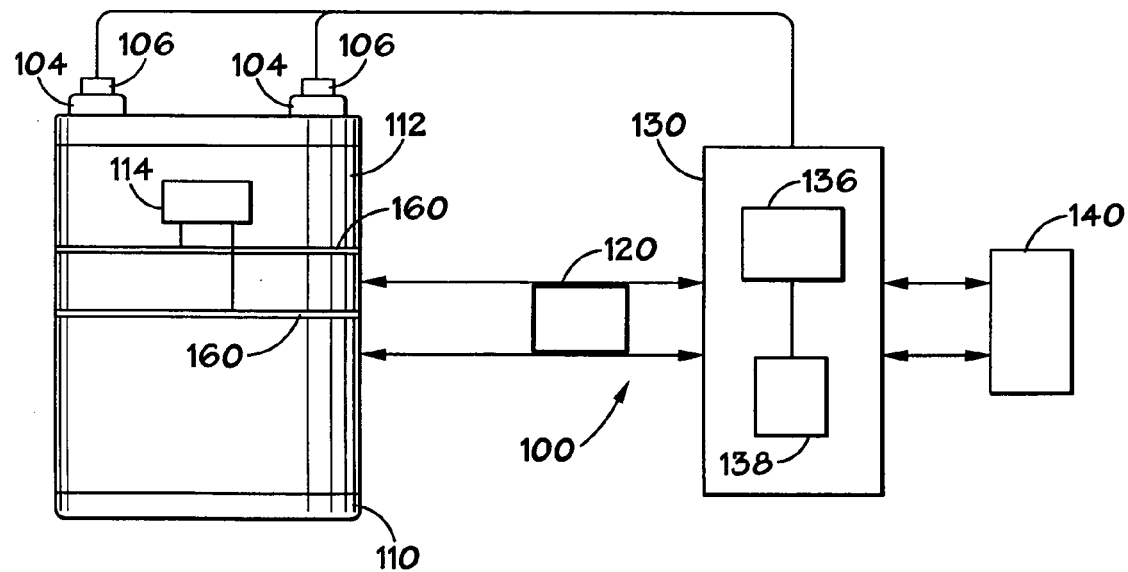
FIGS. 11A and 11B are schematic drawings of systems used with liners according to the present invention.

FIG. 11A shows schematically a system 100 according to the present invention for receiving, processing, and transmitting information based on the signals from fiber optic cables. A pipeline (or pipe) 110 has a liner 112 (like the liner 12 described above or like any liner according to the present invention) with a fiber optic system 114 as described above with fiber optic cables 160 (like the cables 60 described above). The pipeline 110 has a variety of pipeline-associated devices and apparatuses 104 (two shown schematically), each with an operator or controller 106. In one particular aspect, the pipeline 110 has a plurality of apparatuses 104 which are valves that selectively control the flow of fluid through the pipeline and each valve has a controller 106 which is in operational communication with the fiber optic system 114. A measurement system 120 provides a communications interface between the pipeline 110 and a control system 130 (e.g. a pipeline operator's control room with a SCADA system 136). The SCADA system 136 includes a computer system 138 which receives digitized signals from the system 120 which has converted the analog signals from the pipeline 110 into digital form) indicative of temperature and/or strain along the length of the pipeline 110. Either the system 120 or the system 138 has a programmable medium programmed to note an anomaly or spike in either temperature or strain or both. Such an anomaly or spike can indicate a potential leak (temperature spike) or a potential overstress condition or impending liner failure (strain spike) in the pipeline 110. In one aspect the system 130 activates an alarm or alarm system 140 when an alarm value for temperature, strain or both is reached. In one particular aspect, each of the apparatuses 104 is a pipeline valve; an alarm is provided by the system 140 in response to signals from the system 114 (temperature or strain or both measured and indicating a leak at a location between the valves 104), 120, 130; controllers 106 on each valve 104 are activated to close both valves 104; and both valves 104 are closed, isolating the length of the pipeline 110 between the valves.

Figure 11B:
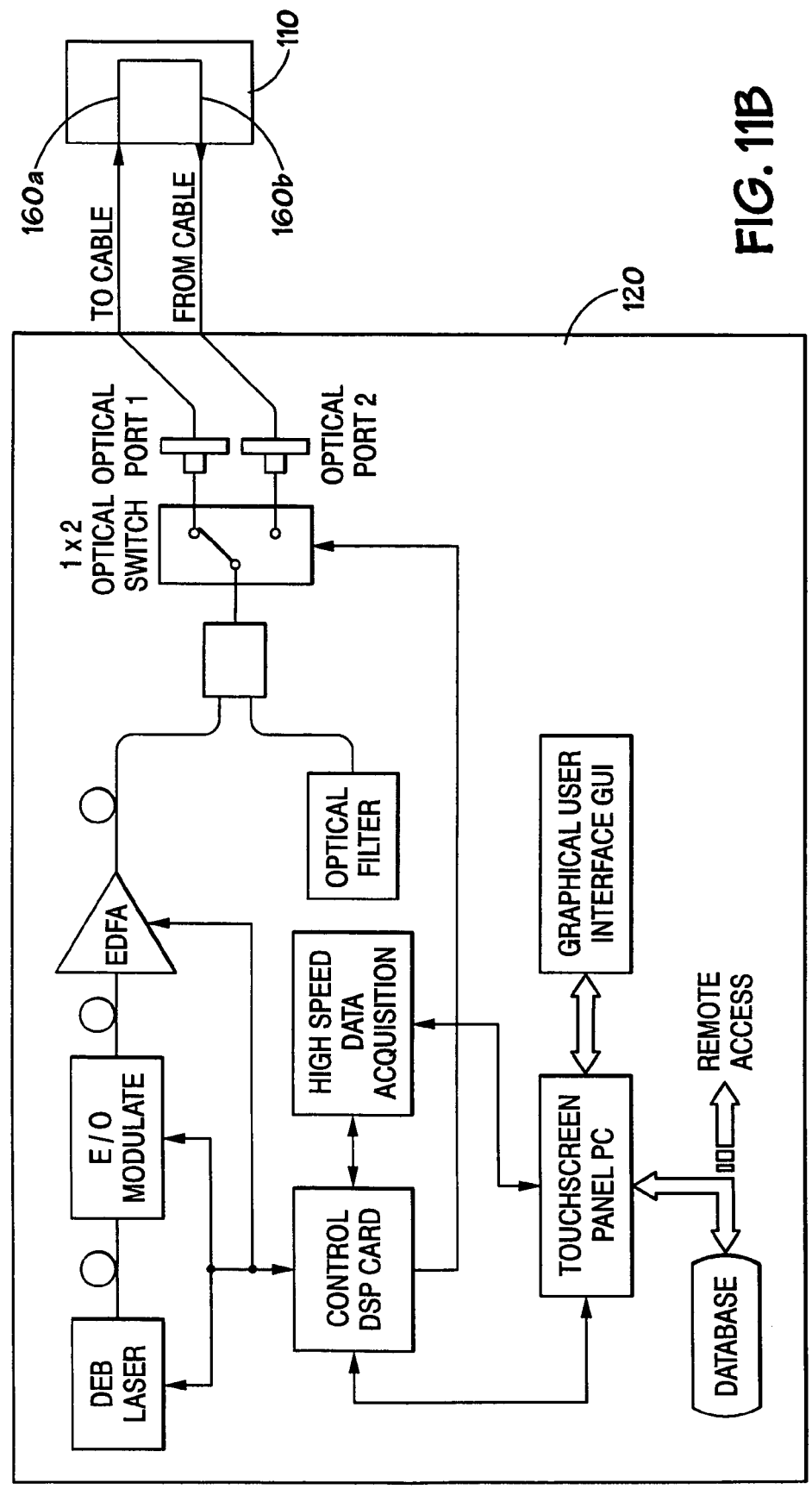

FIG. 11B illustrates schematically one particular embodiment of a system 120 (e.g. a commercially available Model DiTest Model STA 201 from Smartec S/A company) connected to a pipeline 110. Fiber optic cables 160a, 160b are looped as shown or terminated with a reflective end (as may be done with any cable of any system herein). In one aspect, instead of looping the cable, a mirror is provided at the end of the cables 160a. 160b for beam bounce back in the same cable. As shown in FIG. 11B, the prior art measurement system 120 is, according to the present invention, used with the pipeline 110. The measurement system 120 sends a signal (e.g. a laser beam) to and through the upper (as shown in FIG. 11B) fiber optic cable 160a and receives a signal back through the lower (as shown in FIG. 11B) fiber optic cable 160b. The system 120 inputs signals into the fiber optic cables; monitors the return signals; processes the return signals (including A/D conversion); produces digital signals indicative of measured parameters (temperature and/or strain of the pipeline 110) e.g. temperature sensitivity within 4° F. and/or strain sensitivity within 0.002%.

It is old and well-known to use grooves or recesses 71 in a cover 70 as shown in FIG. 1 (see, e.g. U.S. Pat. No. 6,220,079). Optionally, a cover 70 according to the present invention as shown in FIG. 1 may have one, two, three, four, five, six, seven, eight or more interior grooves or recesses 72. Such grooves or recesses are used within a pipeline lined with a pipe liner 12 to provide a space to hold gases from the fluid flowing through the pipeline which permeate through layers of the liner 12.

Figure 12:
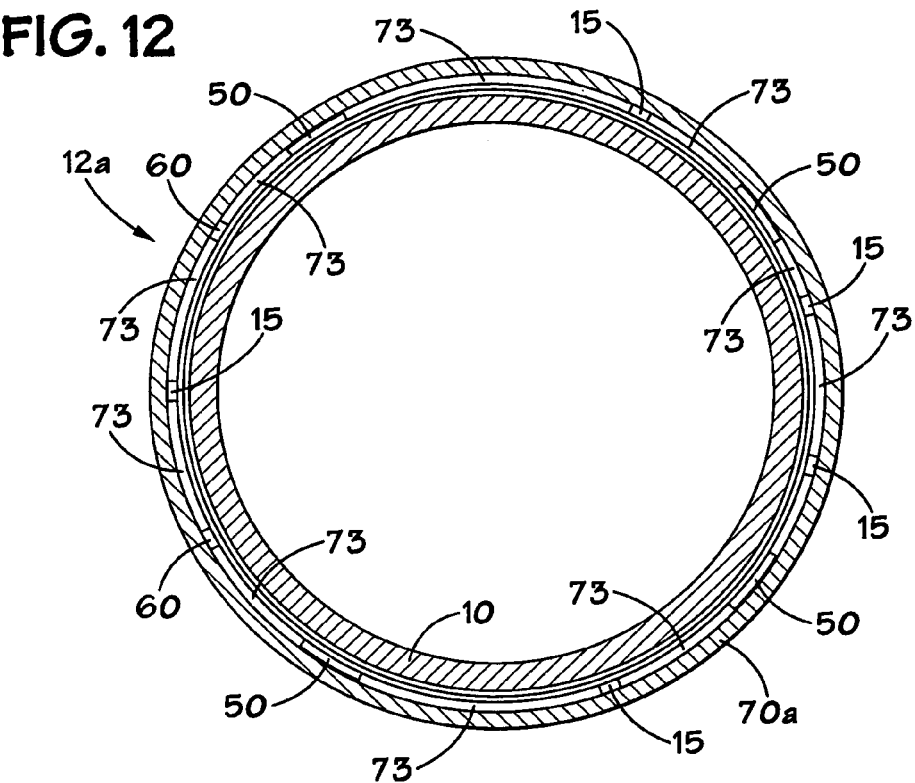

Optionally, according to the present invention, a cover 70 is provided with no grooves 71 and with no grooves 72. As shown in FIG. 12 a pipe liner 12a (like the pipe liner 12) has one, two, three, four, five, six, seven, eight or more spacers 15 (two shown) over which is applied a cover 70a. The cover 70a has no grooves, interior or exterior, and spaces 73 formed adjacent the spacers 15 provide a volume that can be entered to vent accumulated gases. Alternatively, one or more grooves like the grooves 72 and/or like the grooves 71 may be used with the liner 12a.

Figure 13:
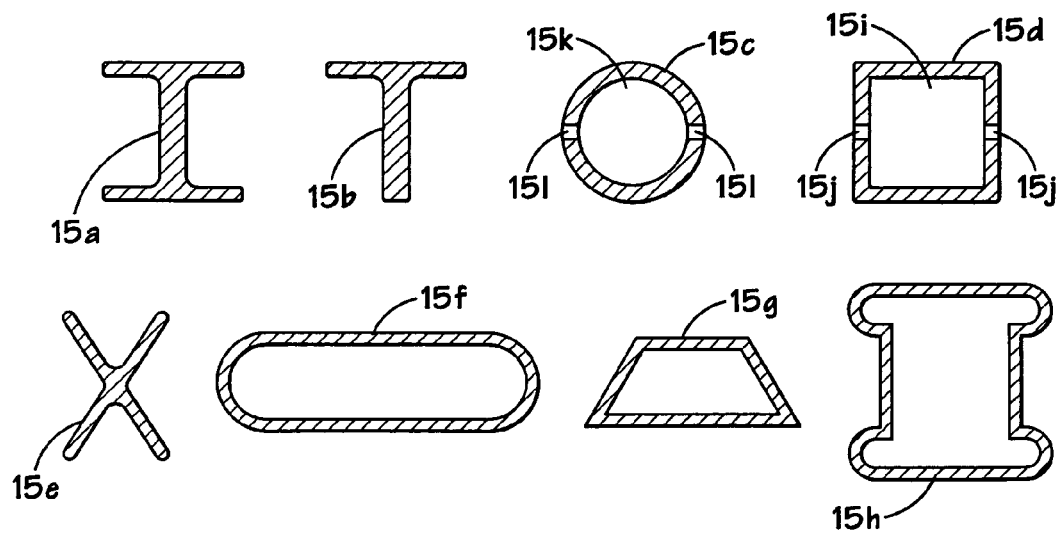
FIG. 13 shows shapes for spacers according to the present invention.

As shown in FIG. 13, the spacers 15 may be any desired shape (shapes 15a-15h shown in cross-section) and they may be made of any material, including, but not limited to metal, metal alloys, non-conducting metals, non-conducting metal alloys, plastic, wood, fiberglass or composite. Any hollow spacer may have a hollow interior, e.g., interiors 15i, 15k, and one or more vent holes, e.g., holes 15j or 15l.

When gases permeate a liner 10 and enter into grooves 71, grooves 72 and/or spaces 73, this accumulated gas is removed from the spaces adjacent the grooves or from the spaces 73, e.g. by vacuuming from ports provided along a pipe or pipe line. Such gas permeation is reduced, according to certain embodiments of the present invention, by co-extruding with the first layer 10 a thin layer 17 (shown partially, FIG. 1; encompasses entire length and circumference of the pipe or pipeline) of impermeable material (e.g. 0.060 inches thick) which is on the wetted side (an interior side) of the first layer 10 and serves as a pressure barrier. In one aspect this layer 17 is EVOH (ethylene vinyl alcohol copolymer) or NYLON (Trademark) material. In another aspect, to reduce gas permeation, a thin layer 19 (see FIG. 7; e.g. 0.060 inches thick) of HDPE is co-extruded with the first layer 10. The layer 19 has, optionally, a plurality of nanotubes NT, e.g. functionalized single wall nanotubes throughout the layer 19 (see FIG. 7A) which both inhibit gas permeation through the first layer 10 and which strengthen it. In one aspect, by volume, between about 1% to 5% of a layer is made of these nanotubes; and in one particular aspect about 2%. Optionally a thin layer 13 (shown in dotted line, FIG. 1) of thermoplastic material, e.g. but not limited to SARAN (Trademark) wrap, is used interiorly of the cover or first layer 10. Optionally, a layer 15 (like the layer 19) is wrapped around the or an outermost layer of fabric (e.g. the layer 30, FIG. 4) to help maintain components in place.

In certain materials and certain ballistic materials, e.g. the SPECTRA (Trademark) material creeps (i.e., elongates under loading) which can result in a loss of strength of an overall layer. To strengthen such layers and to reduce creep therein, a plurality of functionalized single wall nano tubes is added to the second layer 20 and/or to the third layer 30 (and/or to any other layer or component). Using functionalized nano tubes from NanoRidge Materials, Inc. results in substantially no increase in weight of a layer or of a component, e.g. of a layer 20 or a layer 30 due to their small size. In certain aspects, by volume these nano tubes are about 1% to 5% of a component or of a layer's total volume and, in one particular aspect, are about 2% of this total volume.

In certain aspects for the layers 10, 20, 30 a mixture of fibers can be used instead of using, e.g. only SPECTRA (Trademark) material fibers. For example, carbon fibers (20% to 50% by volume) can be mixed with SPECTRA (Trademark) fibers. The fabric layer 20 and/or the fabric layer 30 (and/or in any embodiment any reinforcing fabric layer) may have, optionally, a coating on either or both sides thereof to help maintain the fabric in a described position in the liner and with respect to other liner components. In certain aspects such a coating is a low melting point thermoplastic, e.g., but not limited to EVA, HPPE, or LDPE. In one aspect, nanotubes, e.g. the single wall nanotubes in layer 19 are added (e.g. sprayed on) to the fabric before coating to increase fabric strength and to reduce creep or unwanted movement of the fabric. In certain aspects, any fabric layer herein may include foil tape, e.g. aluminum foil, integral with the fabric in strips or pieces, e.g. strips SS shown in FIG. 4. Any fabric layer herein may, optionally, include a binder throughout the fabric to stabilize it and facilitate handling of it; e.g. an EVA binder increases a fabric's coefficient of friction. In those fabrics herein that may have a coating as described above a binder can be used.

In certain aspects the tapes 50 is a thermoset tape, e.g. material of unidirectional carbon fibers impregnated with a thermoplastic binder, e.g. EVA or a thermosetting resin, e.g. epoxy; e.g. in certain particular aspects 1 to 6 inches wide and 0.02 to 0.125 inches thick, optionally with an epoxy binder throughout.

Figure 14:
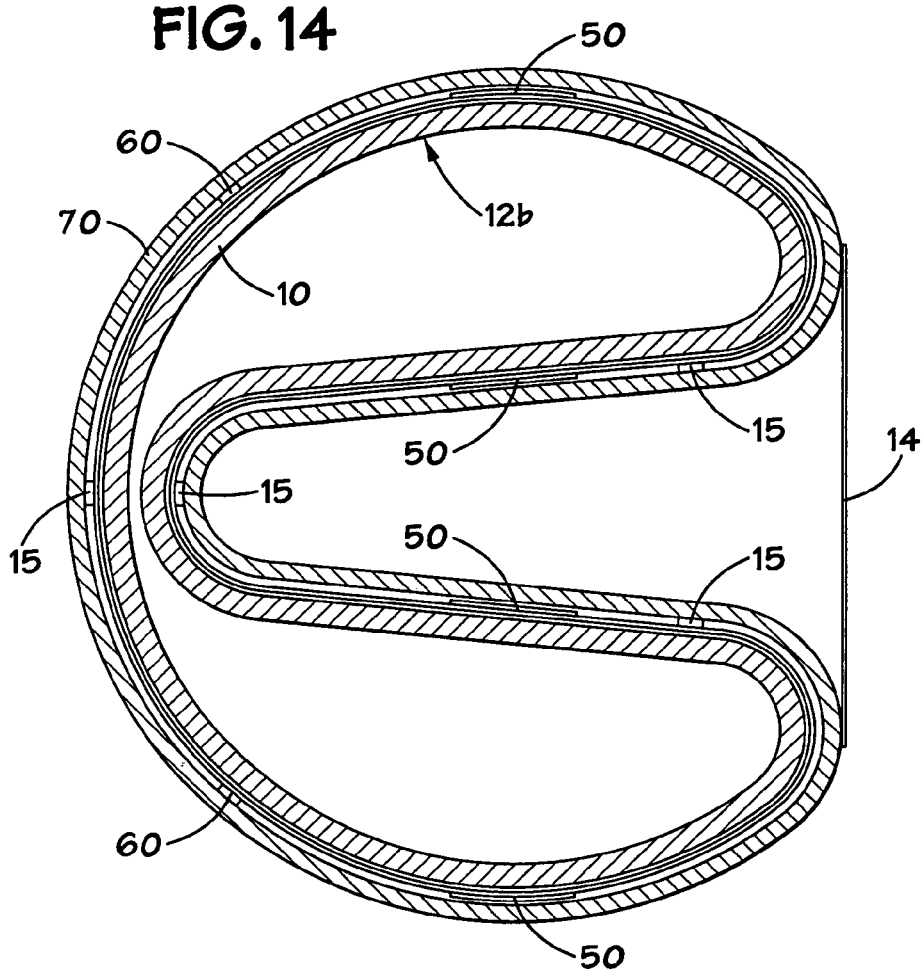

FIG. 14 illustrates a liner 12b (e.g. as a liner 12a in FIG. 12; and like numerals indicate like parts) which has been folded or deformed into the general "C" shape shown in FIG. 14. The liner 12b is folded, and the tapes 50 are positioned, so that in the folded configuration shown in FIG. 14 a plurality of tapes 50 are generally aligned with each other. With the four tapes 50 as positioned in FIG. 14, pulling of the liner 12b into a pipe or pipeline is facilitated by attaching and pulling at the location of each tape 50. It is within the scope of the present invention to provide one, two, three, four, five, six, seven, eight or more tapes like the tapes 50 aligned on a deformed liner which is deformed into any shape.

As shown in FIG. 14, according to the present invention a liner may have spacers 15 which are located so that they support the cover and/or provide channel(s) for the collection of permeated fluids. In one particular aspect as shown, the spacers 15 provide uniform support for the cover without limiting the ability to deform the liner 12.

Optionally, a connector strip or tape 14 may be used to maintain the liner 12b in its deformed shape as shown in FIG. 14. The strip or tape 14 may be glued, bonded, or adhered to the outer cover of the liner 12b at points as shown to hold the deformed liner in the configuration shown. Any suitable material may be used for the strip or tape 14; e.g., adhesive tape; duct tape; polyethylene tape; or a foil or plastic strip whose ends are glued, bonded or adhered to the liner. Such a strip or tape or strips or tapes 14 may be used with a liner deformed into any shape to maintain that shape during a liner installation procedure and/or for handling outside a pipe or pipeline prior to such installation. Upon initiation of re-forming of the liner to a full expanded configuration, the strip 14 breaks relatively easily.

Figure 15:
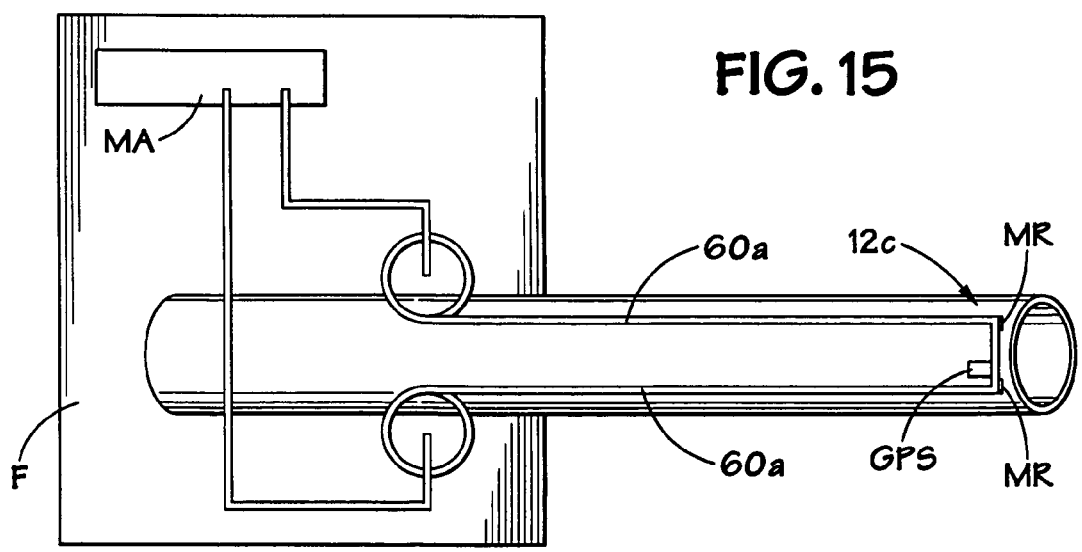
FIG. 15 is a schematic view of a method for producing a liner according to the present invention.
Figure 16A:
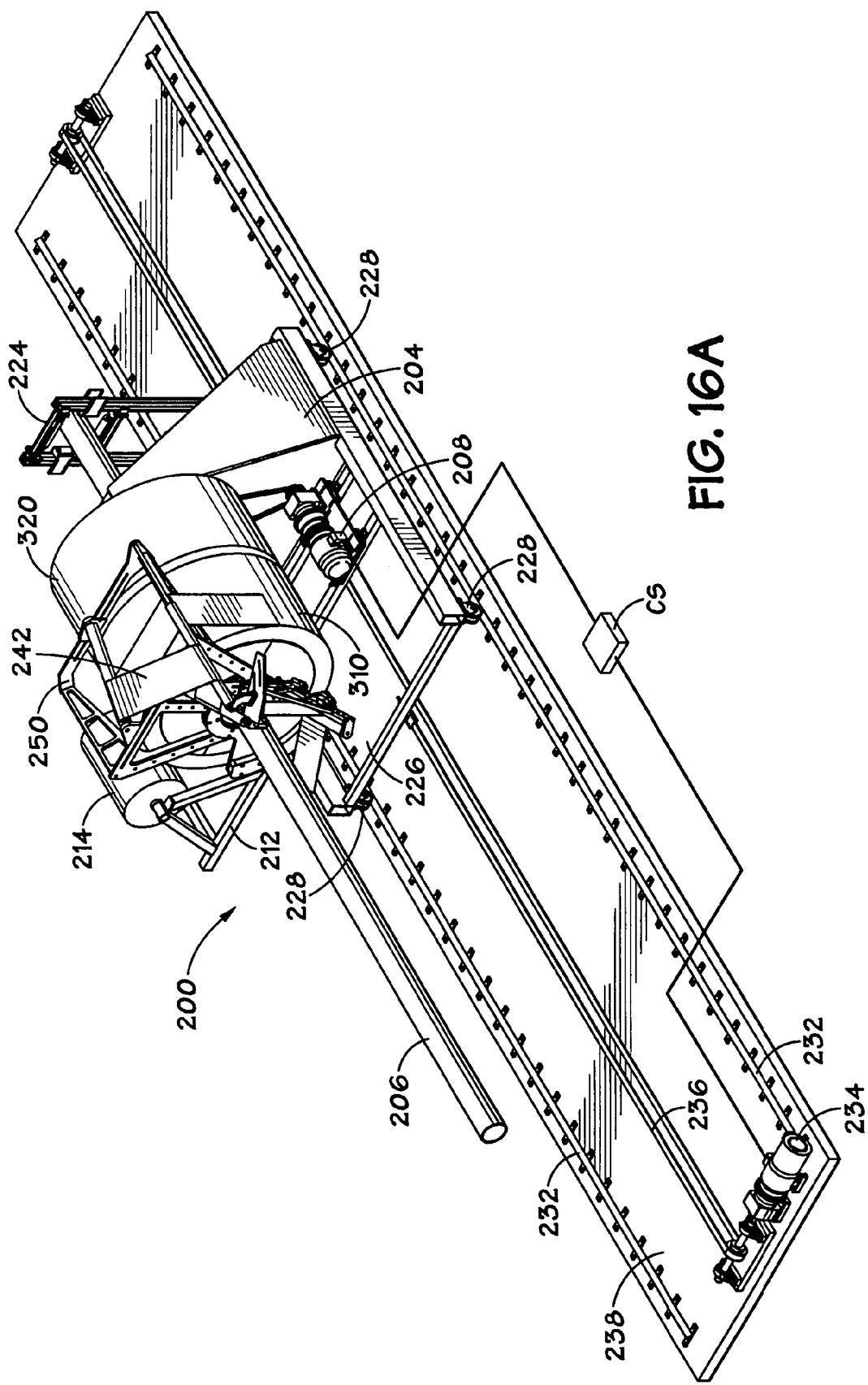
FIG. 16A is a perspective view of a system according to the present invention.
Figure 16B:
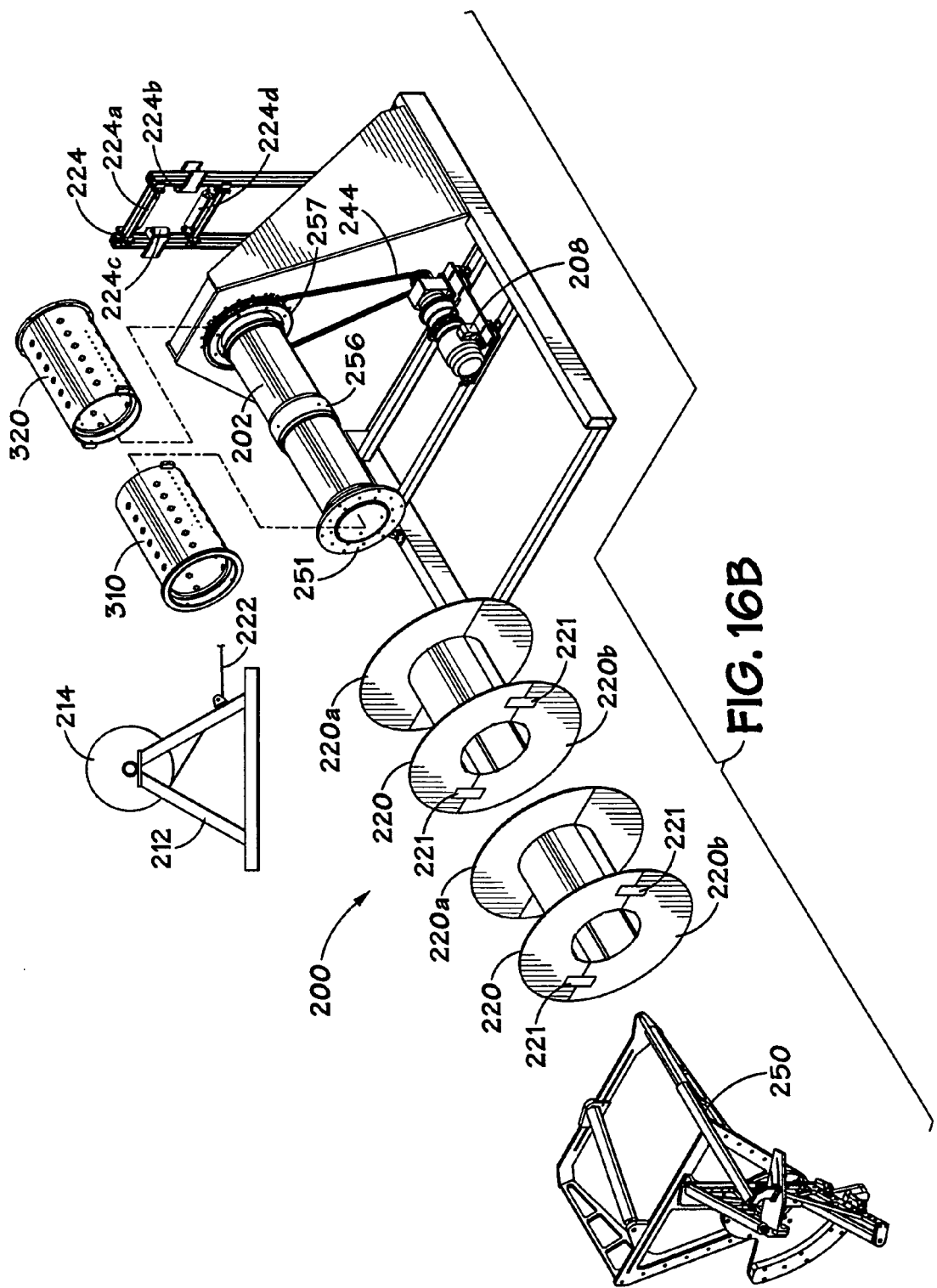
FIG. 16B is an exploded view of part of the system of FIG. 16A.
Figure 16C:
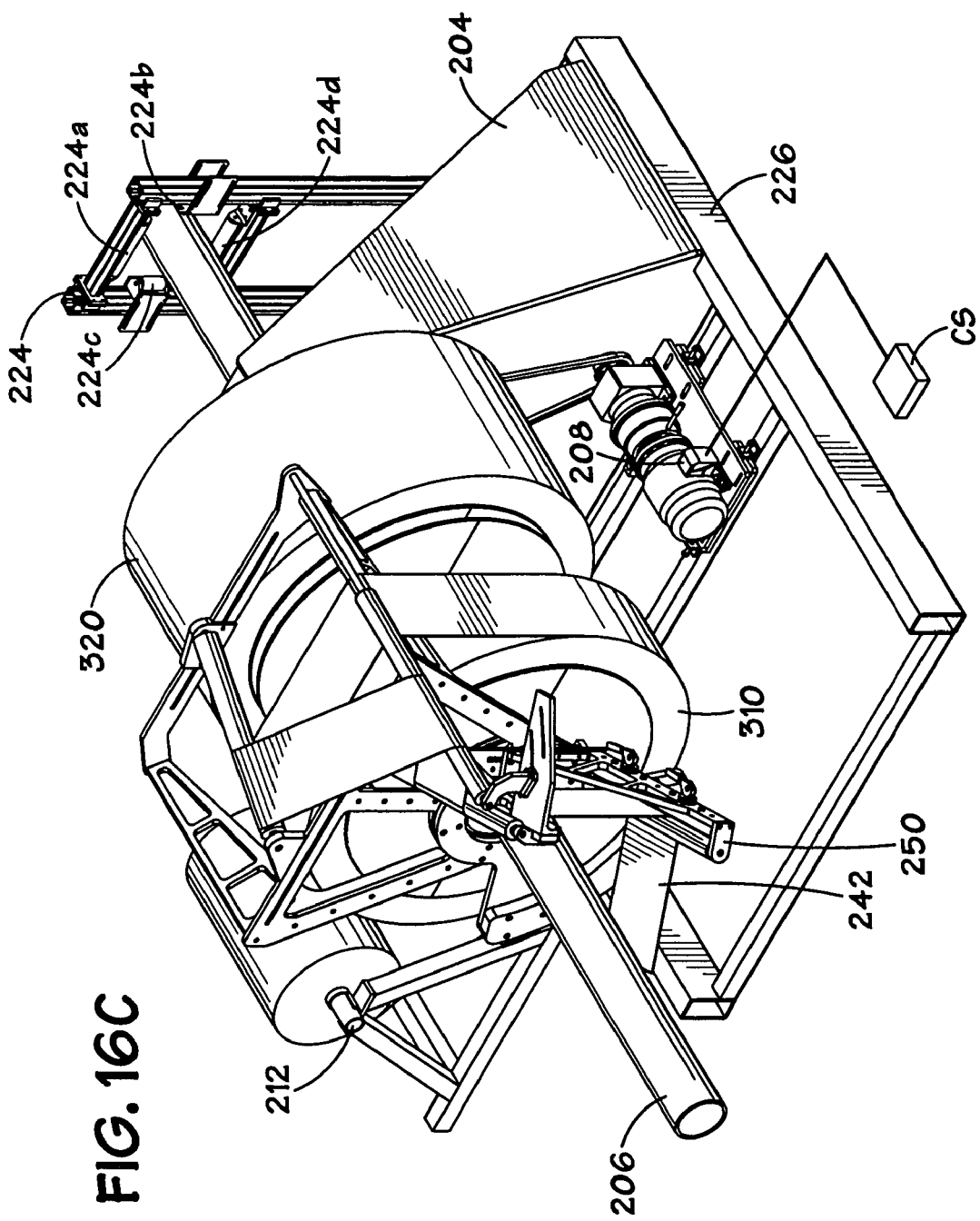
FIG. 16C is an enlarged view of part of the system of FIG. 16A.
Figure 16E:
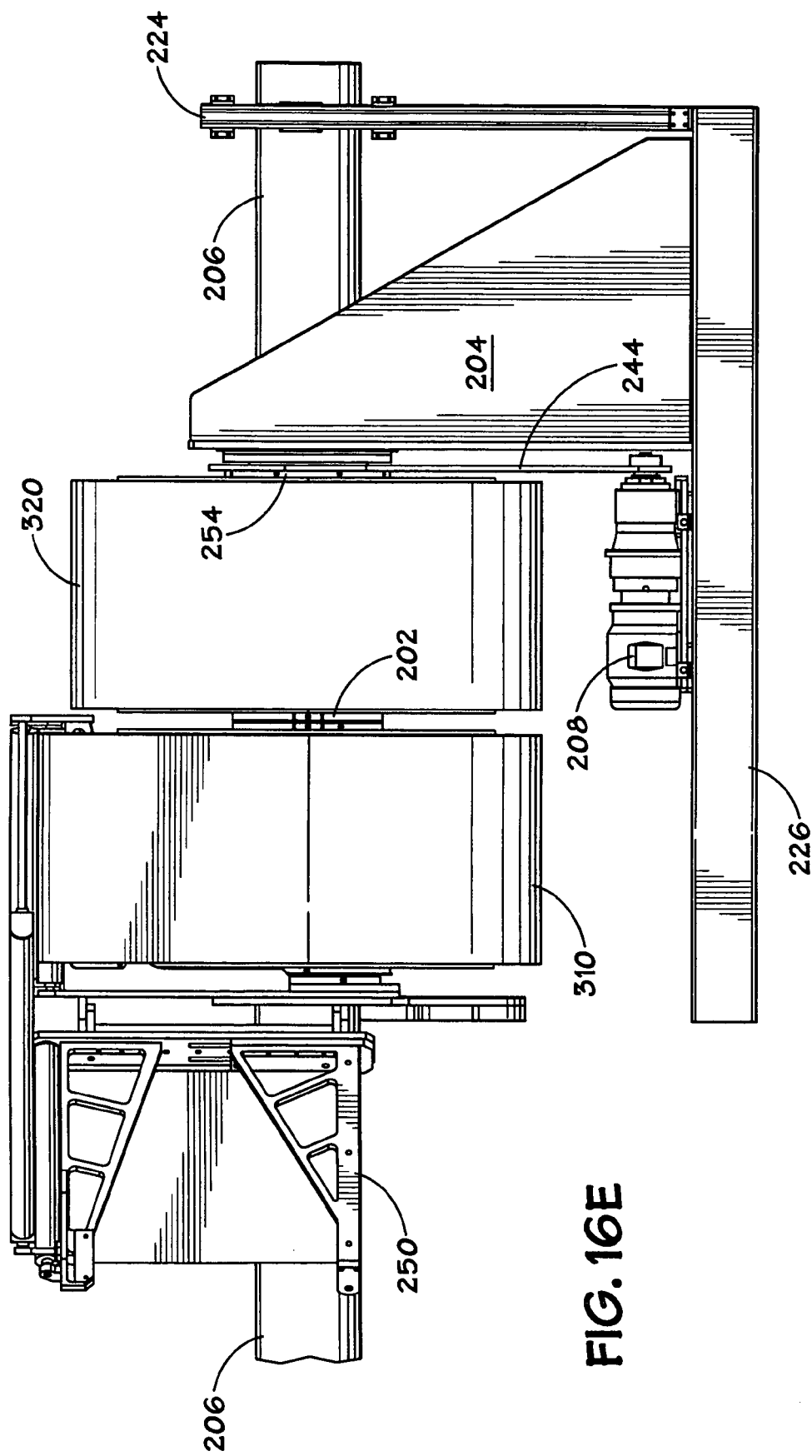
FIG. 16E is a first side view of part of the system of FIG. 16A.
Figure 16G:
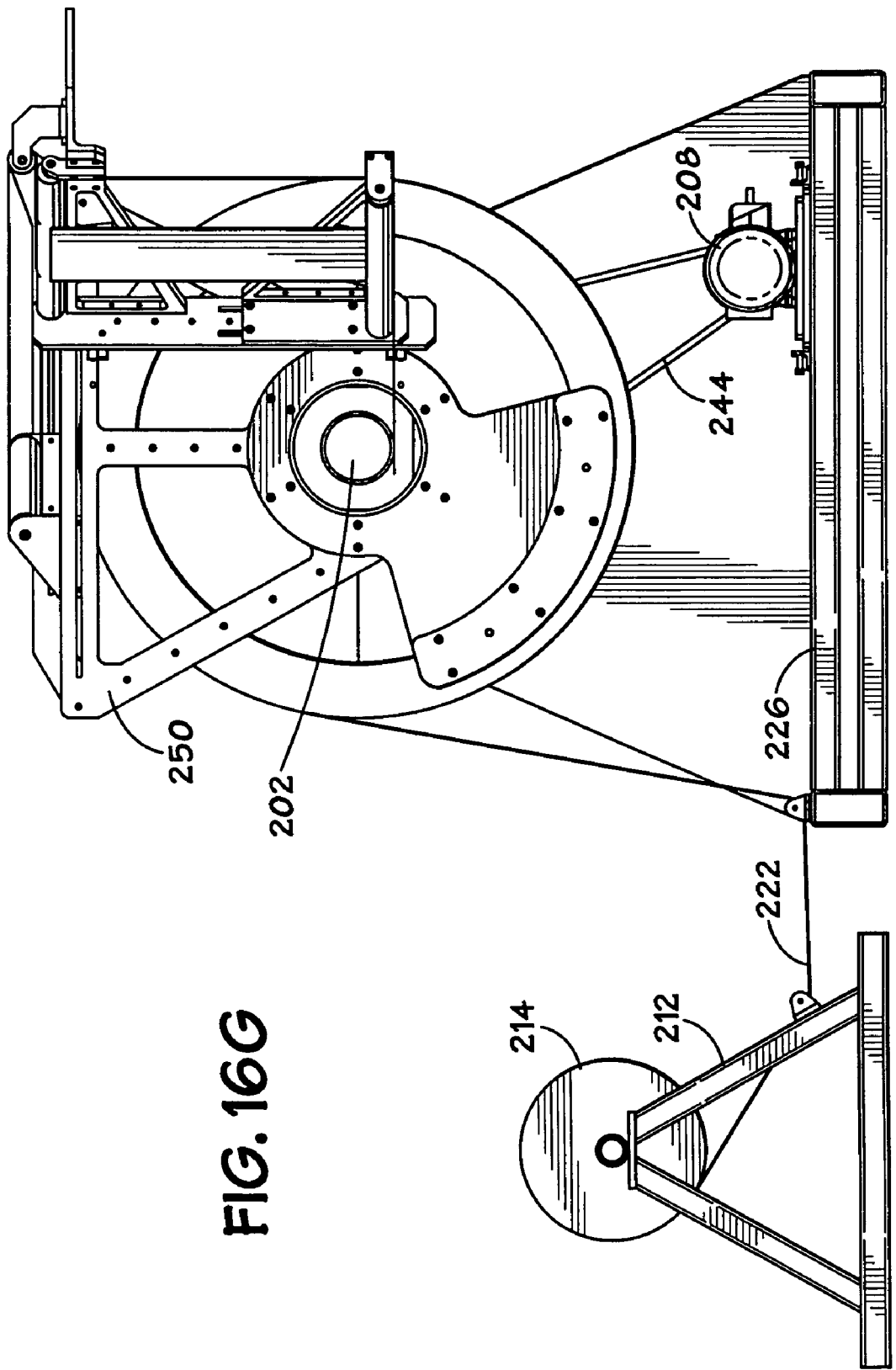
FIG. 16G is a front view of part of the system of FIG. 16A.
Figure 19B:
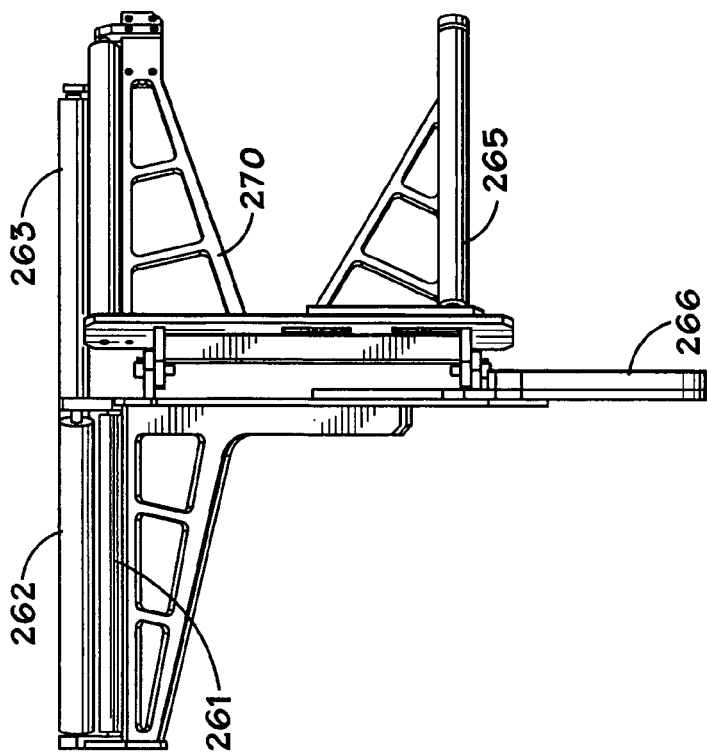
FIG. 19B is a first side view of the assembly of FIG. 19A.
Figure 19A:
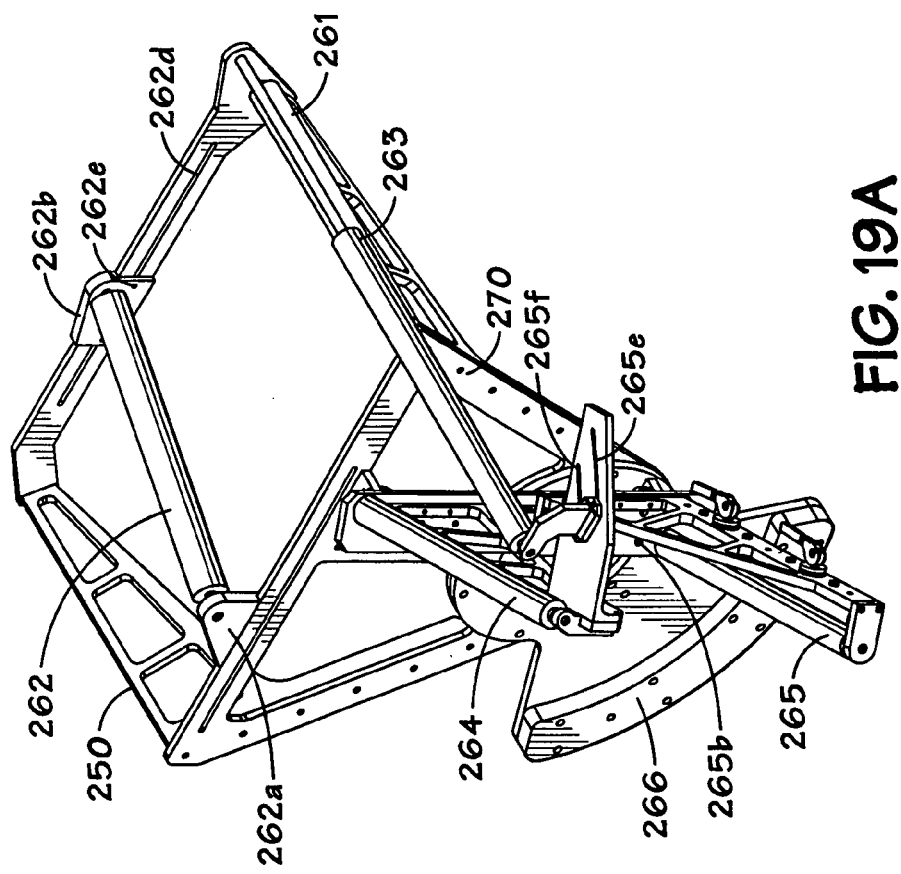
FIG. 19A is a perspective view of a deflection arm assembly of the system of FIG. 16A.
Figure 19D:
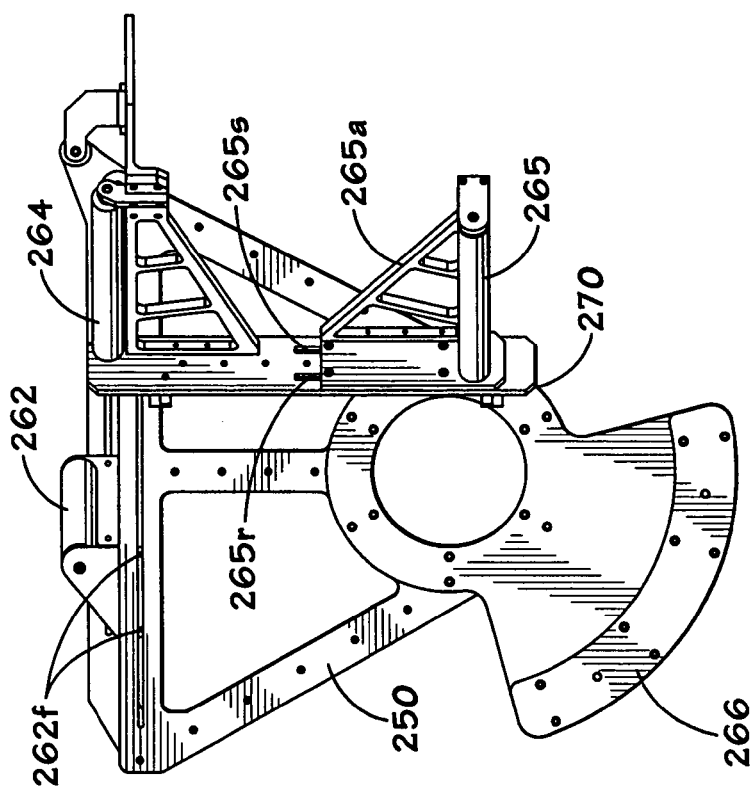
FIG. 19D is a front view of the assembly of FIG. 19A.
Figure 19C:
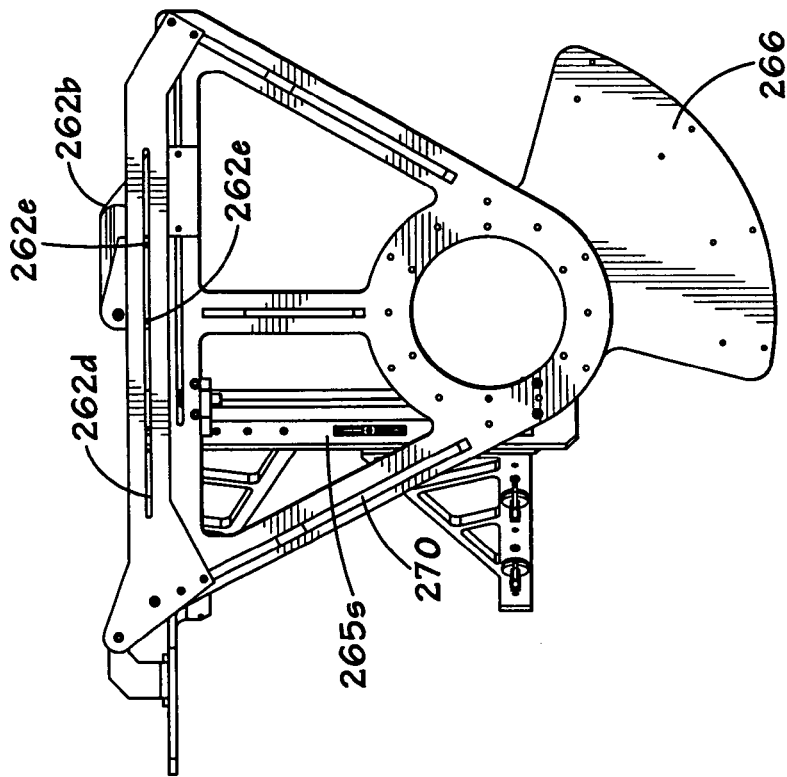
FIG. 19C is a back view of the assembly of FIG. 19A.
Figure 19G:
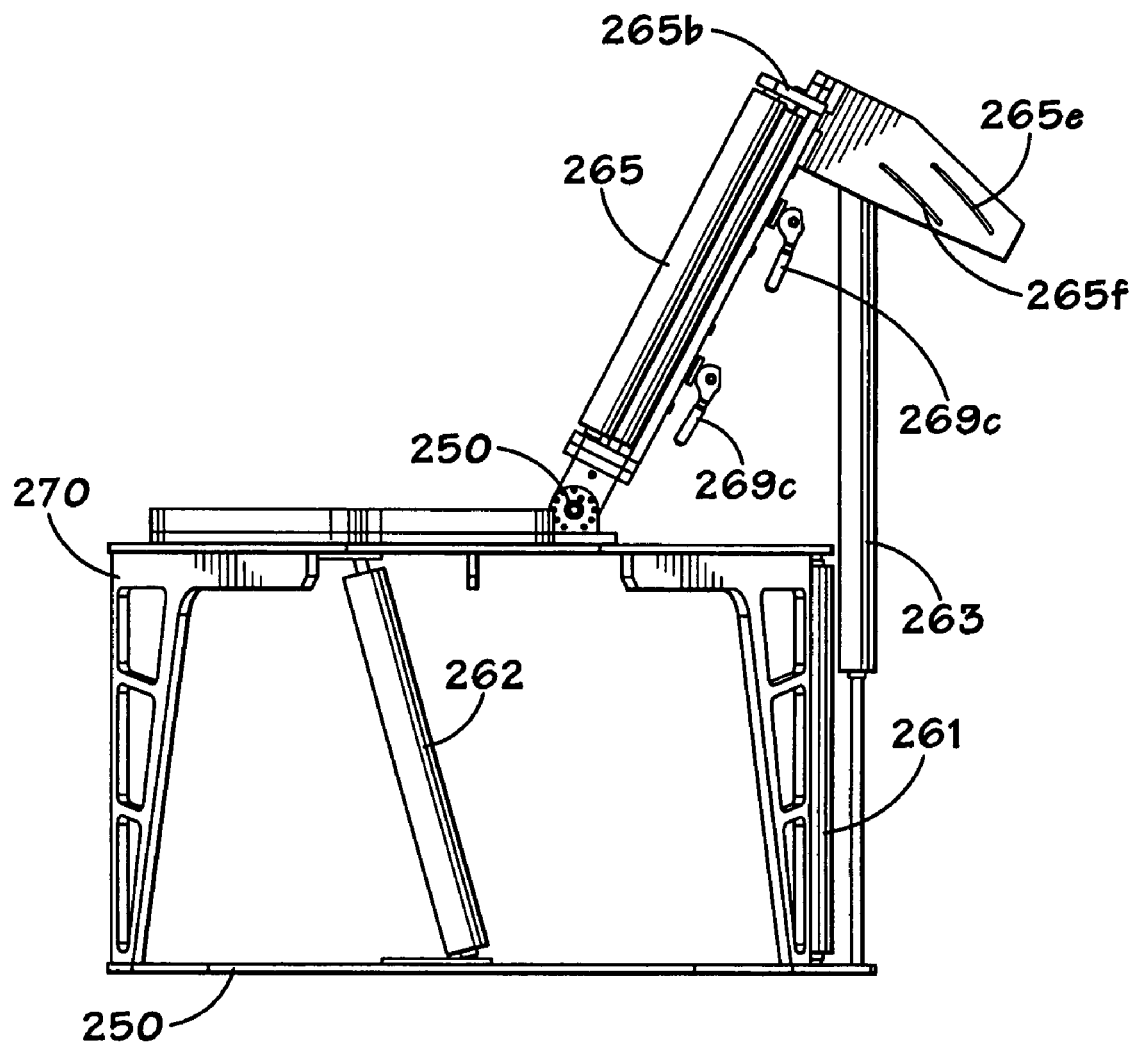
FIG. 19G is a bottom view of the assembly of FIG. 19A.
Figure 19H:
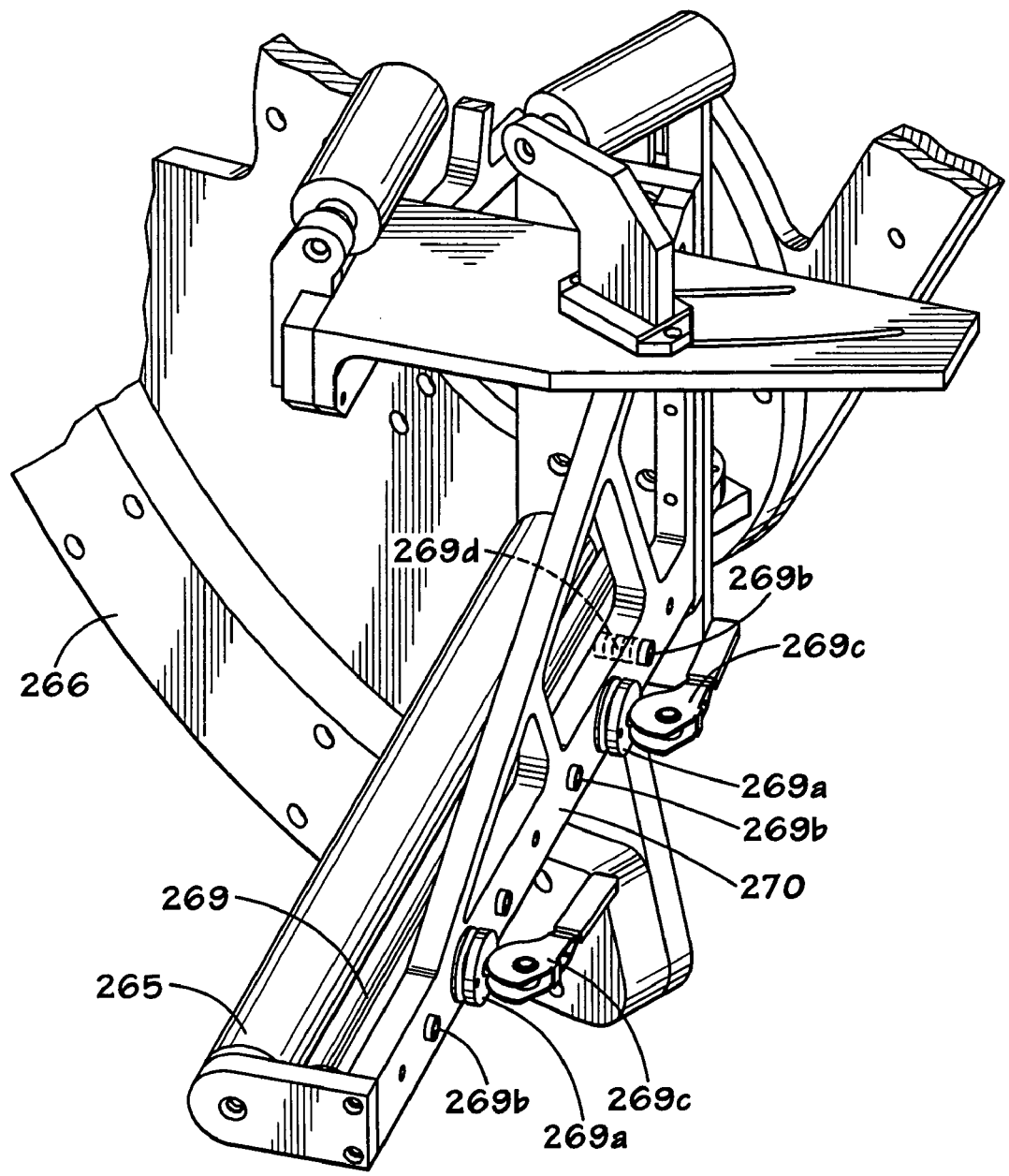
FIG. 19H is a perspective view of the assembly of FIG. 19A.

FIG. 15 illustrates schematically a method according to the present invention for producing a pipe liner 12c according to the present invention which has fiber optic cables 60a (like the fiber optic cables 60 or any fiber optic cables described above) which are applied to the liner 12c as the liner 12c is being made to monitor installation effects, e.g. location in a host pipe and/or applied tension. As the liner 12c exits a liner making machine in a production system F, a system MA (e.g. like the system 120 described above) is in communication with the fiber optic cables (as the system 120 is in such communication as described above). By employing mirrors MR at the distal end of the fiber optic cables and/or by using a GPS sensor apparatus GPS (which emits a GPS locator signal transmitted through the fiber optic cables) at the end of the liner 12c, the system MA can determine the distance from the end of the liner 12c at the machine exit to the distal end of the produced liner, thereby providing a measurement of the length of the produced liner 12c. Strain, if there is any on the liner 12c as it is produced is measured providing a measure of the pulling force. Similarly, using a system MA during a liner installation procedure, a measurement is provided which indicates the length of liner installed within a pipe or pipe line; and, in one aspect, a measurement of a strain on a liner as it is pulled into a pipe or pipe line. Any pipe or pipeline herein may have a fiber optic cable or cables with a mirror MR and/or a GPS apparatus as described above.

In one particular embodiment the inner core of a liner according to the present invention, e.g. a first layer 10, is an extruded pipe including two different thermoplastic layers, an inner "wetted" layer positioned adjacent to flowing fluid and made of a chemically resistant material such as Nylon™ material or Evott. An outer layer is made of less chemically resistant material (e.g. HDPE). In one aspect the inner layer is about 20% the thickness of this inner core and the outer layer is about 80%. A cover, e.g. a cover 70, can have a similar structure.

The present invention, therefore, in certain and not necessarily all embodiments, provides a liner for pipe, the liner including: a first layer comprising a hollow cylinder of polymeric material; a second layer comprising wrap material, the wrap material wrapped around the first layer; a third layer comprising wrap material wrapped around the second layer, in one aspect the third layer at an angle to the second layer or the third layer not at an angle; the liner having a first end spaced apart from a second end and at least one strengthener member on the liner and extending from the first end to the second end of the liner; the liner being a stand-alone structure. Such a liner may have one or some, in any possible combination, of the following: wherein the polymeric material is thermoplastic material; wherein the polymeric material is thermoset material; wherein the wrap material of the second layer is oriented HMWPE fibers; wherein the wrap material of the third layer is oriented HMWPE fibers; wherein the second layer is wrapped without overlap on the first layer; wherein the third layer is wrapped without overlap on the second layer; wherein the at least one strengthener member is any of tape, sock, and flattened tube; wherein the at least one strengthener member is made of high strength fiber material; wherein the at least one strengthener member is a plurality of members spaced-apart around a circumference of the first layer; a plurality of fiber members wound around and outside of the at least one strengthener member to maintain the at least one strengthener member in position on the liner; at least one fiber optic cable extending along the liner; wherein the at least one fiber optic cable provides communication between the liner and an apparatus; a protective cover, e.g. wound on, sprayed on, or painted on and around the liner; wherein the at least one fiber optic cable is connectible for communication with a measurement system for measuring temperature; wherein at least one fiber optic cable is connectible for communication with a measurement system for measuring strain; wherein the at least one fiber optic cable is connectible for communication with a measurement system for measuring temperature and strain; wherein the protective cover is made of polymeric material; wherein the first layer is at a first angle substantially equal to and opposite to a second angle of the second layer; wherein the second layer is bonded at discrete points or over substantially all its surface to the first layer; wherein the third layer is bonded at discrete points or over substantially all its surface to the second layer; wherein the second layer is bonded to the first layer at discrete points and the third layer is bonded to the second layer at discrete points; a plurality of standoff members disposed beneath and in contact with the cover; wherein the liner is deformable into a deformed shape for insertion into a pipe; wherein the shape is a general "C" shape; a plurality of spacer members beneath and in contact with the cover for supporting the cover without limiting deformability of the liner; and/or wherein the cover has a plurality of interior recesses for venting fluid permeating through the liner.

The present invention, therefore, in certain and not necessarily all embodiments, provides a continuous fabric reinforced stand alone pipe-liner fabricatable in-situ, the pipe liner having a longitudinal axis, and including discrete lengths of polymeric tubular extrusions welded together with welds to form a continuous cylindrical hollow member with a first end and a second end, at least two layers of reinforcement of a high-strength low-weight strengthening material, said at least two layers of reinforcement applied axially from the first end to the second end of the continuous cylindrical hollow member, wherein each of said layers has a layer width and each of said layers provides coverage of the continuous cylindrical hollow member, wherein each of said layers is wound on the continuous cylindrical hollow member at a wind angle $\phi$, wherein the continuous cylindrical hollow member has an outside diameter, said coverage satisfying the equation (for one width N=1; for multiple widths, N=number of fabric widths used).

Coverage=layer width $(N)/\pi$(Outside diameter) (Cosine $\phi$).

Such a pipe liner may have coverage of 100% and the angle $\phi$ between 50 degrees and 60 degrees; and/or such a pipe liner may include at least one pulling members or a plurality of pulling member applied on the pipe liner from the first end to the second end, either not parallel to the longitudinal axis or substantially parallel to the longitudinal axis of the pipe liner.

The present invention, therefore, in certain and not necessarily all embodiments, provides a method for lining a pipe, the method including pulling a liner into a pipe, the liner as any disclosed herein. In certain aspects of such a method, the liner is a continuous stand-alone structure at least three, four, five or ten miles long.

The present invention, therefore, in certain and not necessarily all embodiments, provides a method for operating a controller of an apparatus on a pipeline, the method including receiving with a control system a measurement signal from a measuring system in communication with a pipeline, the pipeline having an outer pipe structure and a liner therewithin, the liner as any disclosed herein with at least one fiber optic cable extending along the liner, and a protective cover on and around the liner, and a measuring system receiving signals from the at least one fiber optic cable indicative of any of temperature within and strain on the pipeline, and controlling the controller with the control system in response to the signals.

In one particular aspect the present invention discloses a system for reinforcing a continuous plastic pipe with a layer or layers of fabric of reinforcing fibers or tape. The fabric being wrapped is concentric (surrounds) the plastic pipe liner (longitudinal axis) before winding. The plastic pipe is moved through the apparatus. A roll of fabric is positioned about the axis of the translating plastic pipe and fabric is drawn from the outside diameter of the roll by rollers on arms of a deflection arm assembly that rotate at a controlled speed and with adjustable fabric tension. The arms take the fabric and reorient it to the winding or wrapping angle. In certain aspects the positioning arms are adjustable for fabric width and angle within a range from 40 to 70 degrees. The fabric width is determined by the "Coverage" formula discussed above.

In certain aspects tape is used instead of fabric. The tape has a matrix material that encapsulates fibers (or in which the fibers are embedded). In fabrics the fibers are not encapsulated or embedded in a matrix. Reinforcing wrapping material includes fabric and tape.

FIGS. 16A-21I illustrate one embodiment of a system 200 according to the present invention for wrapping material on pipe. The system 200 has a main shaft 202 connected to and supported by a support frame 204. Two cores 210, 220 have material (fabric or tape) wound thereon that is provided for wrapping onto a plastic pipe 206. The core 210 is a payout core from which a deflection arm assembly 250 receives material 242 and wraps the material 242 onto the pipe 206. The core 220 is a rewind core which is movable to replace the payout core 210 upon emptying of the payout core 210. Each core 210, 220 is made of two halves, 210a, 210b and 220a, 220b, respectively, which are releasably connected together, e.g. with fasteners, screws, and/or (as shown) with releasably cooperating hook-and-loop fastener material, e.g. VELCRO™ material 221. Each core 210, 220 is removably mounted and rotatable with respect to a corresponding concentric shaft 310, 320. The concentric shafts 310, 320 are rotatably and movably mounted on the main shaft 202. The concentric shafts 310, 320 are rotatable independently of each other. A removable end flange 251 maintains the concentric shafts on the main shaft 202.

A motor 208 with a chain 244 rotates the concentric shaft 320 on the main shaft 202 to wrap material 222 from a rewind stand 212 onto the rewind core 220. The rewind stand 212 has a rotatable roll 214 of material 222 which is fed onto the rewind core 220. The chain 244 engages a sprocket 257 which is connected to the main shaft 202 and which is adjacent a sprocket attachment flange 254. A sprocket attachment flange 254 is connected to the shaft 202 and maintains the drive chain 244 in position on the sprocket 257.

Bearings 256 press fit on the main shaft facilitate rotation of the concentric shaft 320 on the main shaft 202.

Pipe supports 224 (one shown) with a plurality of rollers 224a, b, c, d support the plastic pipe 206 as it moves through the system. (Of course the pipe may be non-plastic, metal, composite, fiberglass, etc.) For example, on site the pipe 206 may be made, e.g., extruded with an extrusion machine, and the pipe, as it is produced, is then fed to the system 200. Optionally, the support frame 204 is secured on a base 226 which has rotatable rollers 228 for movement on tracks 232 secured on a support 238. A motor 234 moves a chain or belt 236 which is attached to the base 226 to move the base 226, e.g., while pipe is still being provided to the system 200 and wrapping of material has temporarily ceased so that a full rewind core may be moved into position to replace an empty payout core. The system 200 is moved along the tracks as the pipe moves so that, when the new payout core is in position for wrapping to resume, the wrapping can be continued at the point on the pipe where wrapping was stopped for core replacement. Thus the pipe production operation can be carried on without stopping and the wrapping operation can be done continuously without stopping.

As shown in FIGS. 16D, 17A and 17B, the concentric shafts 310, 320 each has a plurality of rollers 246 rotatably mounted thereon so that a portion 246a of each roller projects beyond an outer surface 248 of the shaft parts. The outwardly projecting roller portions 246a are received in and rotate in corresponding grooves 252 in the interior of the cores 210, 220 (see FIGS. 18A, 18B) which extend along the entire length of the cores 210, 220. Optionally the grooves 252 are metal lined. The concentric shaft 320 has the same general structure as the concentric shaft 310. The shaft 320 has tapped holes to mount the sprocket attachment plate; and the shaft 310 has an access hole for securing the outer bearing. Stops 243a, 243b, FIGS. 16D and 17A, stop the cores 210, 220 from sliding off the ends of the shafts.

This roller/groove structure facilitates movement of and insures proper positioning of the cores 210, 220 on the concentric shafts 310, 320. Each core part 210a, 210b, 220a, 220b has the grooves 252. One to six or more such grooves may be used on a core. In one aspect the core parts 210a, 210b, 220a, 220b are single pieces molded from moldable material such as fiberglass, each with side flanges 211.

The deflection arm assembly 250 as shown, e.g., in FIGS. 16A, 16C and FIGS. 19A-19G, has an arm frame 270 and is rotatable with respect to the core 210 from which it takes the material 242 and wraps it on the pipe 206. In order to receive the material 242 from the core 210 and then wrap it at an angle on the pipe 206, the material 242 is passed over and around a series of rollers 261-265. Each roller 261-265 is rotatably mounted to the arm frame 270. The arm frame 270 is rotated with shaft 207 by the motor 208 around the pipe 206. For smooth rotation, a counterweight member 266 is connected to or formed integrally of the arm frame 270. As shown, the rollers 261-265 are positioned at desired angles to the arm frame 270 so that the deflection arm assembly 250 moves the material 242 at a desired tension from the core 210 and is applied at a desired angle to the pipe 206. The position of the rollers 262, 264 and 265 is adjustable to take into account differences in fabric, tape, or pipe and to adjust the wind angle at which material is wrapped onto the pipe.

Position of the roller 262 is adjustable by releasing bolts 262a (one shown) and moving the roller 262 to a desired position. By loosening bolts 262e, 262f which ride in slots 262c, 262d, position of the roller 262 is adjusted.

Adjustability of the position of the rollers 264, 265 is provided by selectively positioning a roller mount 265a by moving it in slots 265b, 265c in part of the frame 270. This adjustment permits the material to leave the deflection arm assembly at a desired tangent to the pipe.

A pivot mount 265c has a series of holes 265h, e.g. with 2 degree increments to allow for various wind angles. The rollers 264, 265 are pivoted and located so that the material coming off them will be at a correct wind angle. Vertical adjustment in slots 265r, s is to accommodate various size pipes. In one aspect, material comes off the core on tangent to the bottom or top of the pipe. The pivoting adjustability of the rollers provides for adjustment of the wind angle of the material. In one aspect, the method of adjustment includes setting the angle of the rollers 264 and 265 at the pivot point to match the wind angle. Each pivot has 11 holes 265h with 2 degree spacing with a pin 265k to secure it in the correct location. This provides a 20 degree range of adjustment, e.g. from 53 degrees to 73 degrees. Roller 265 is moved up or down to match the diameter of the pipe. The position of the roller 262 is adjusted along the slots to center the web of material on the rollers 265 and 265. Tension is applied from the friction in the concentric shaft, and through a tension bar 269 (see FIG. 19H) which is aligned with roller 265. The material slides between the roller 265 and the tension bar 269. The position of the tension bar 269 is adjustable to provide a desired gap between the tension bar 269 and the roller 265. The gap depends on the thickness of the material. Forcing the material through this gap causes tension. By reducing the size of the gap, tension is increased. The gap setting is adjustable using gap setting screws 269a and movable levers 269c connected to the tension bar 269. Four springs 269d (one shown in dotted line, FIG. 19H) provide adjustable tension on the bar 269 via rotatable screws 269b. Rollers 262 and 263 are, optionally, fixed so that they cannot rotate. The roller 265 is a "gripping roller" which is engaged to hold the fabric in place when fabric runs out on the putout roll. The tension bar 269 springs 269d are compressed during normal running so that the gap between the tension bar 269 and the roller 265 sets the tension. The cam operated lever 269c can release the springs and allow them to push the tension bar 269 against the material and trap it between the tension bar 269 and the roller 265.

Figure 20A:
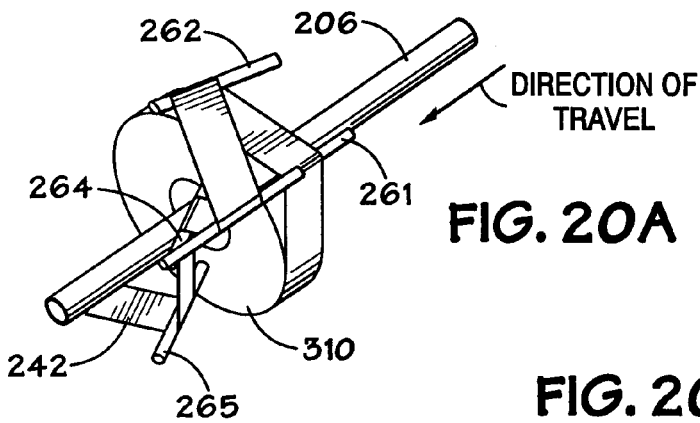
FIG. 20A is a perspective view which illustrates a material path for the system of FIG. 16A.
Figure 20B:
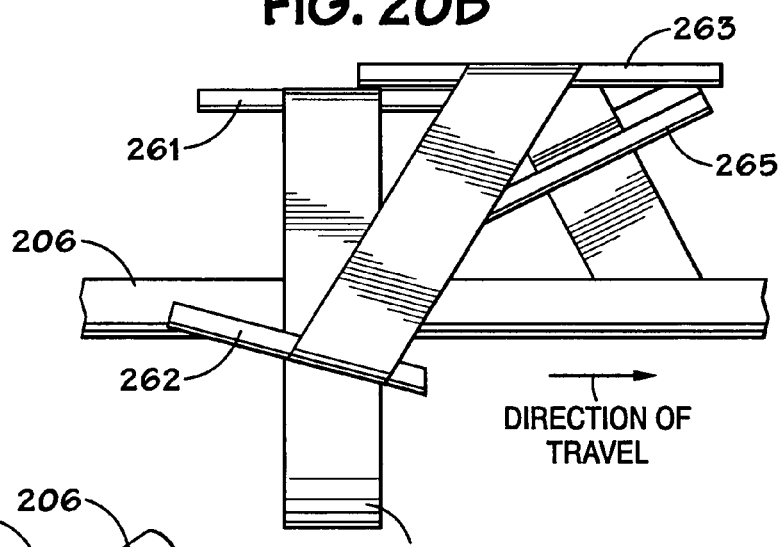
FIG. 20B is a top view of the path of FIG. 20A.
Figure 20C:
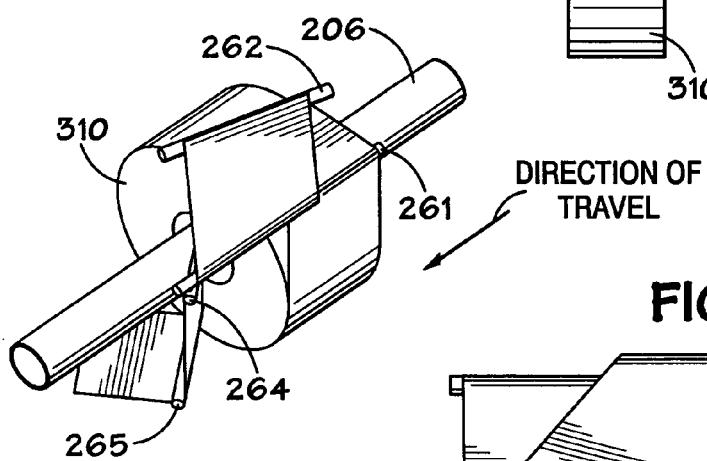
FIG. 20C is a perspective view which illustrates a material path for the system of FIG. 16A.
Figure 20D:
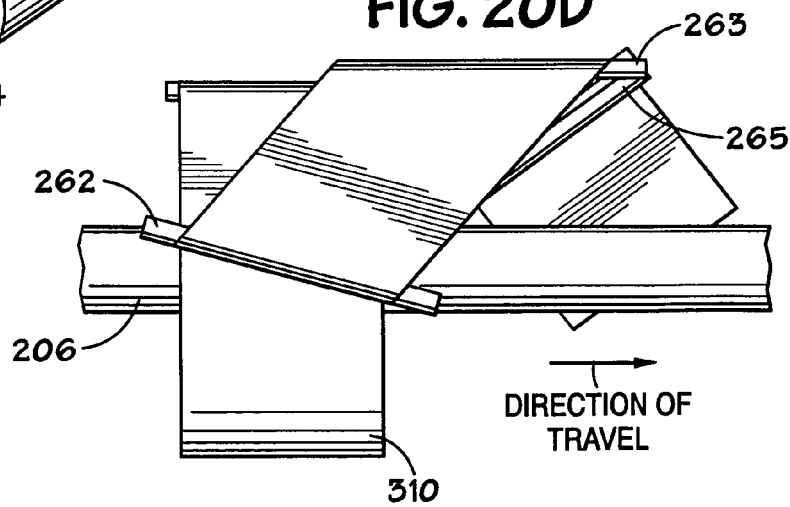
FIG. 20D is a top view of the path of FIG. 20C.

FIGS. 20A-20D illustrate a variety of wind angles for applying material to a pipe with a system like the system 200. As shown in FIGS. 20A and 20B material 242 is applied to the pipe 206 at a positive wind angle of 63 degrees. As shown in FIGS. 20C and 20D material is applied to the pipe 206 at a positive wind angle of 53 degrees.

Figure 21A:
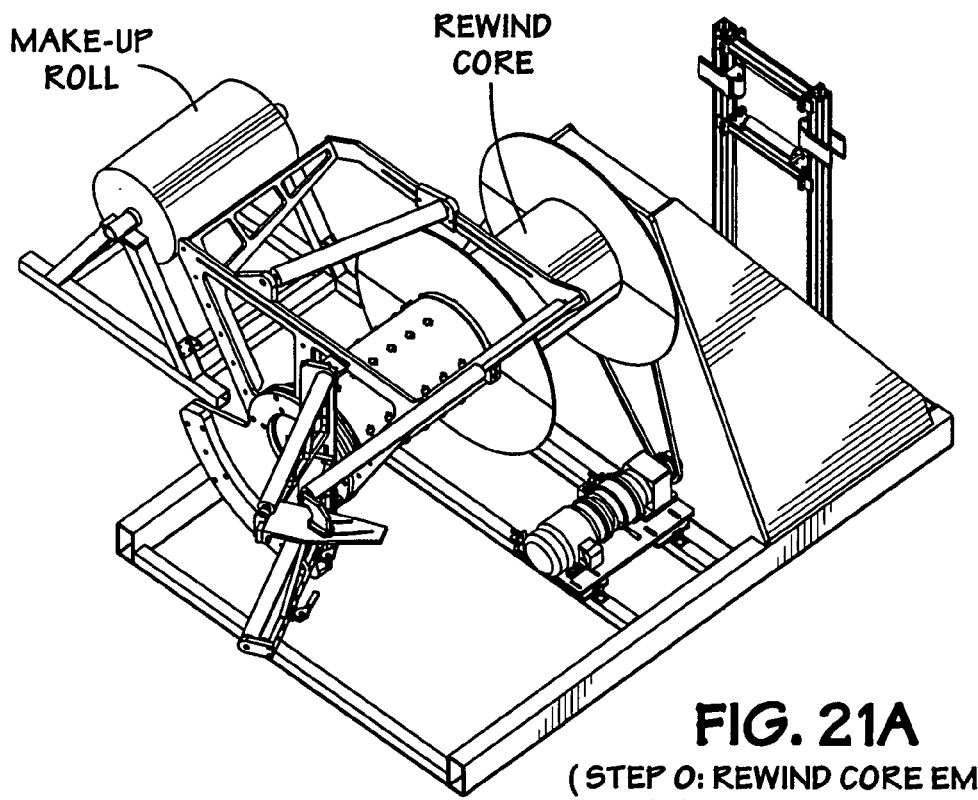
FIG. 21A is a perspective view of part of the system of FIG. 16A showing a step in its operation.
Figure 21B:
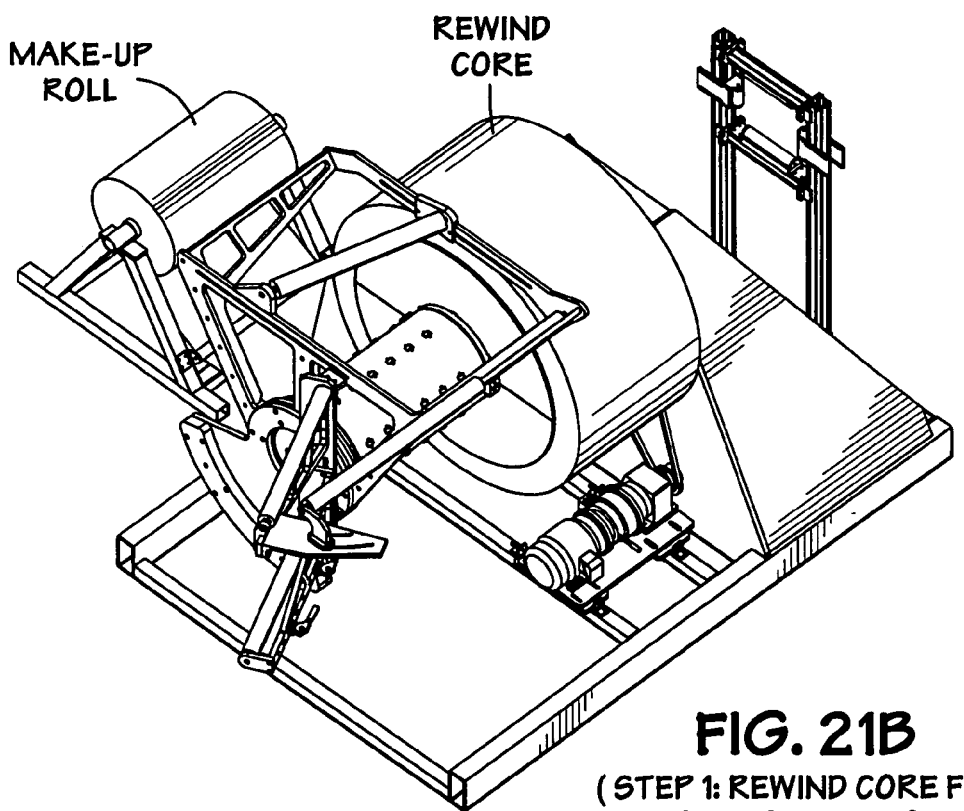
FIG. 21B is a perspective view of part of the system of FIG. 16A showing a step in its operation.

FIGS. 21A-21I illustrate steps in a wrapping method using the system 200. As shown in FIG. 21A the rewind core 220 is empty and the core 210 has been removed. As shown in FIG. 21B the rewind motor 208 was activated and material from the rewind stand 212 has filled the rewind core 220.

Figure 21C:
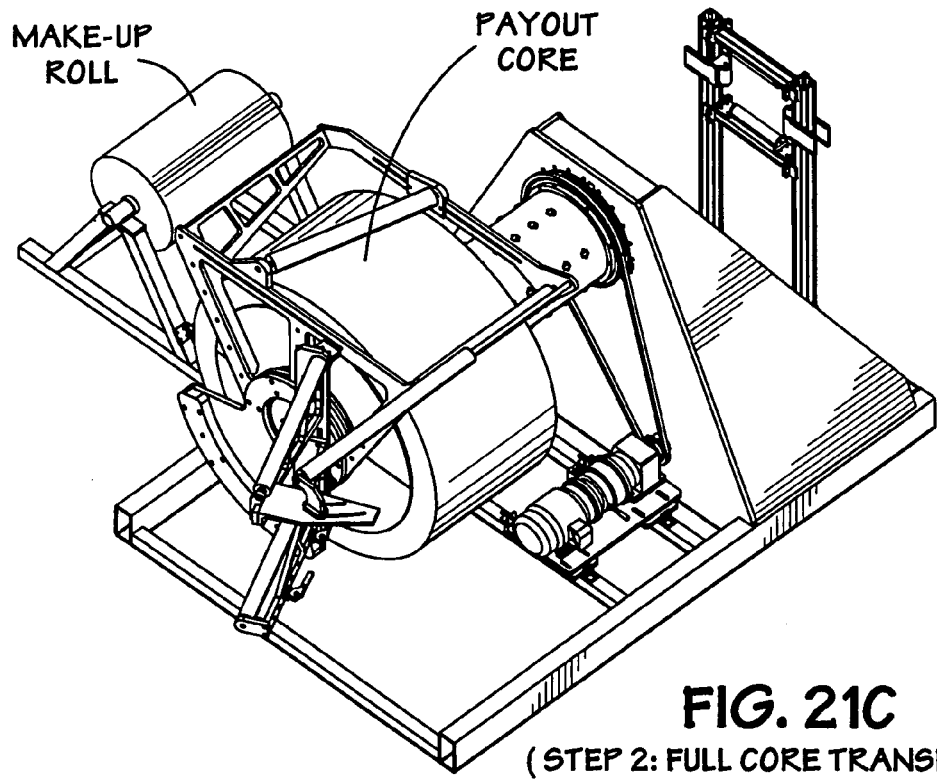
FIG. 21C is a perspective view of part of the system of FIG. 16A showing a step in its operation.
Figure 21D:
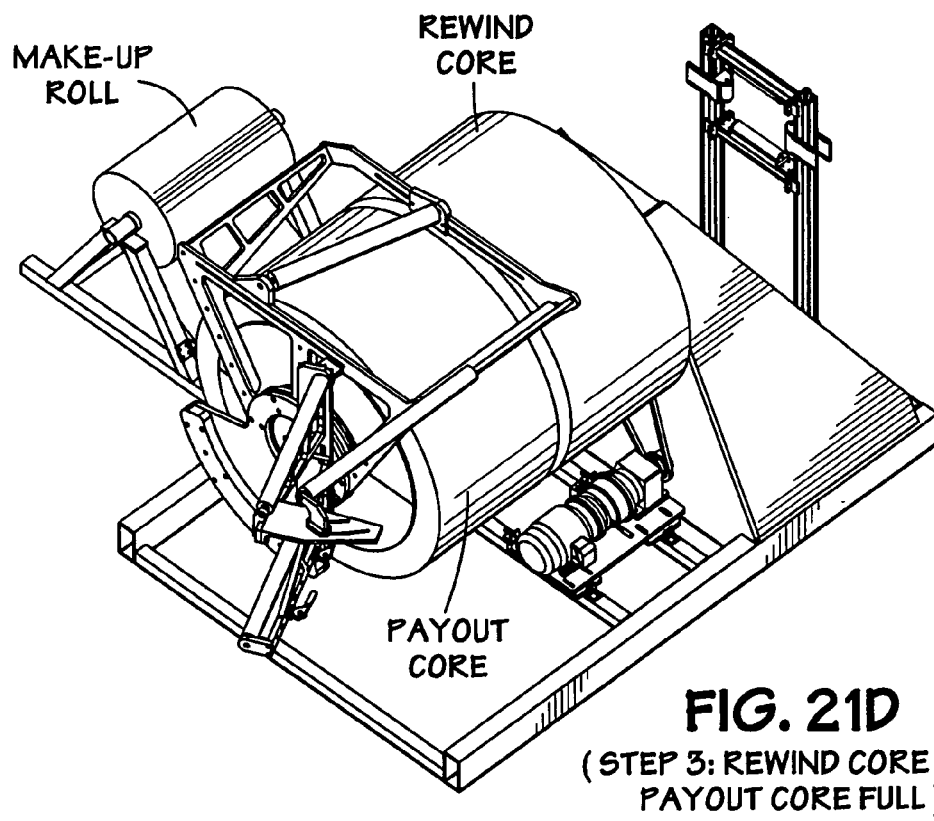
FIG. 21D is a perspective view of part of the system of FIG. 16A showing a step in its operation.
Figure 21E:
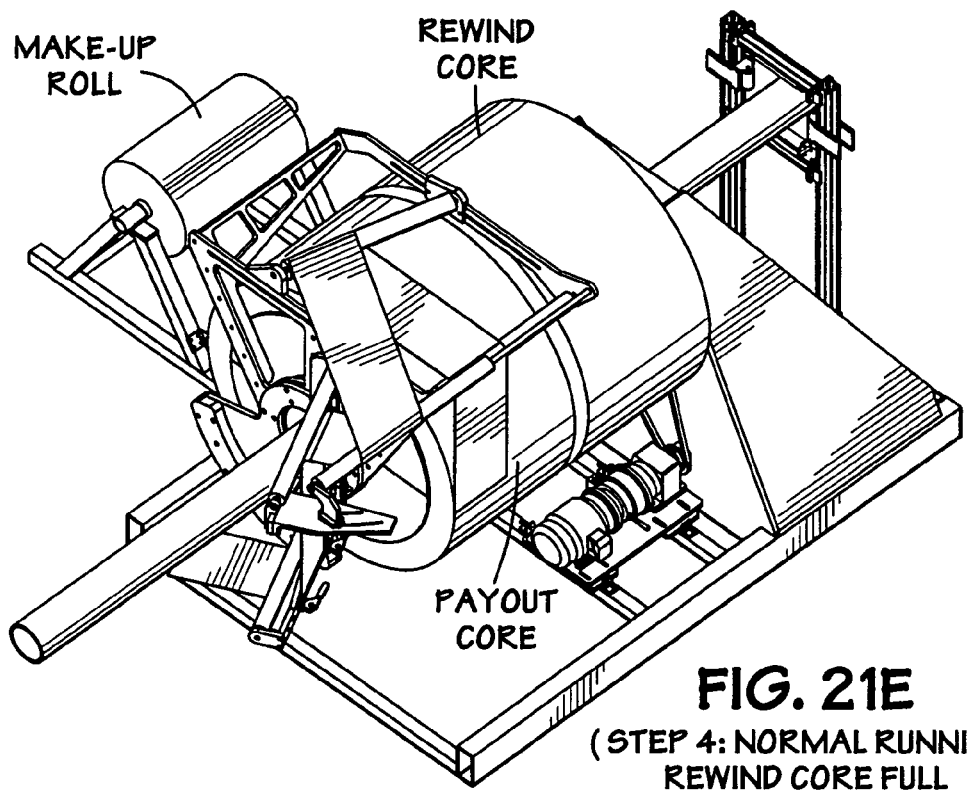
FIG. 21E is a perspective view of part of the system of FIG. 16A showing a step in its operation.
Figure 21F:
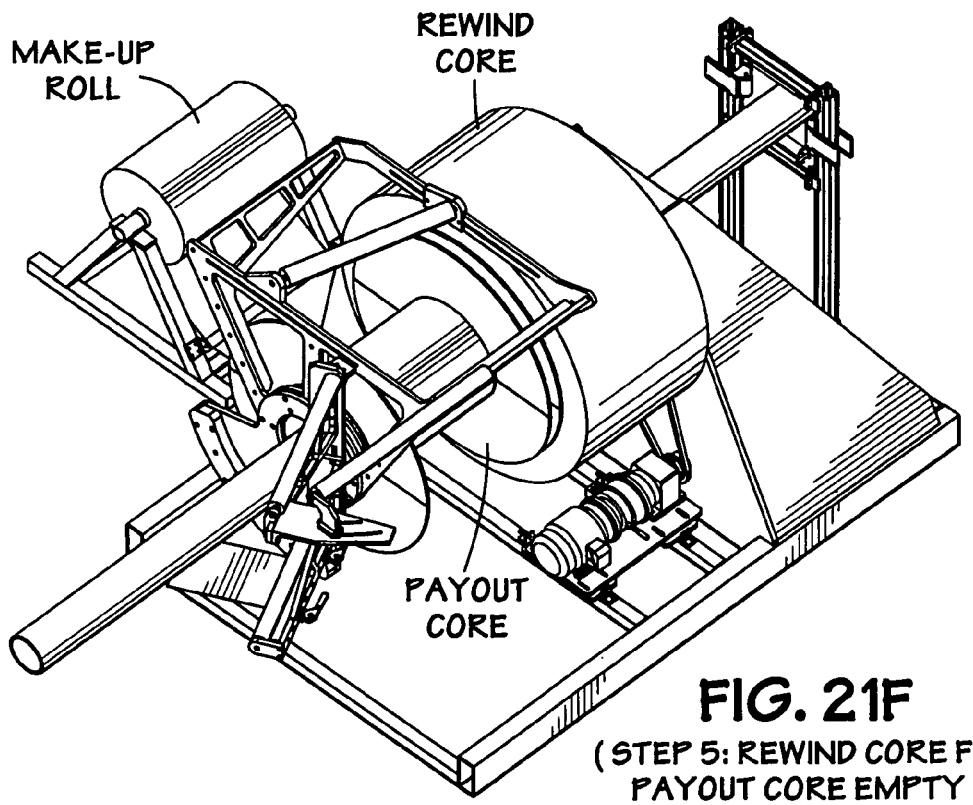
FIG. 21F is a perspective view of part of the system of FIG. 16A showing a step in its operation.

FIG. 21C illustrates the transfer of the filled core 220 to the payout core position by moving the core on the rollers 246 on the concentric shafts. The core which previously was a rewind core 220 is now a payout core 210. As shown in FIG. 21D two split core halves have been secured together to form a new rewind core 220 and the new rewind core 220 has been filled with material. FIG. 21E illustrates the wrapping of material on the pipe 206 with the core 220 full and with material being taken from the core 210 by the deflection arm assembly 250. The core 220 rotates with respect to the main shaft as the deflection arm assembly wraps material onto the pipe. As shown in FIG. 21F, the core 210 has been emptied.

Figure 21G:
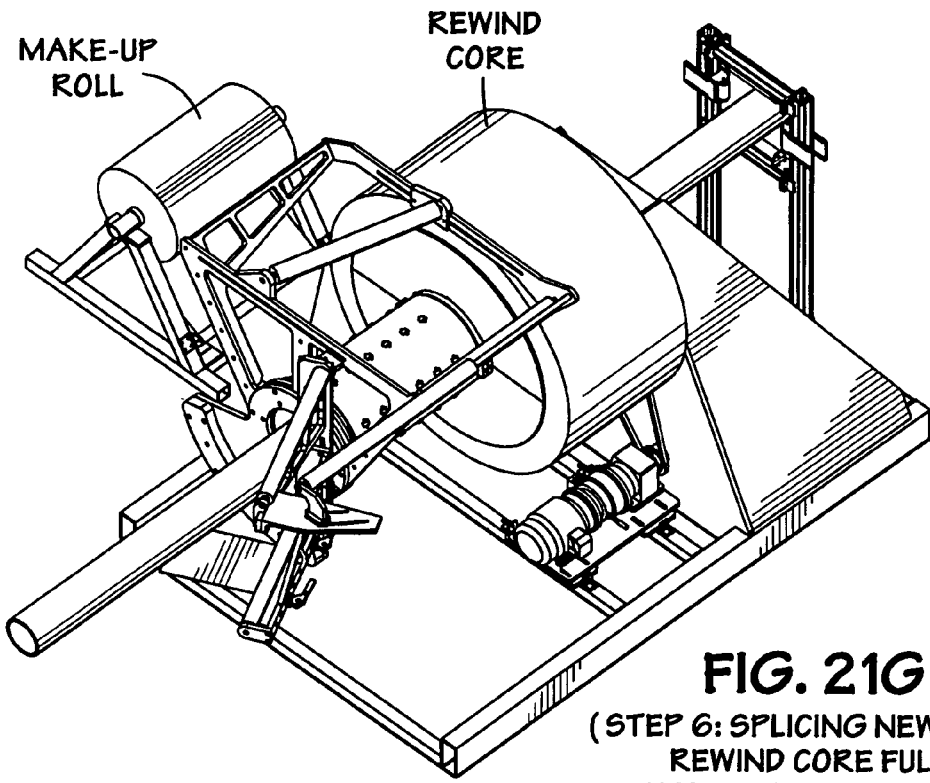
FIG. 21G is a perspective view of part of the system of FIG. 16A showing a step in its operation.

FIG. 21G illustrates removal of the split halves 210a, 210b in preparation to move the full rewind core 220 into the payout core 210 position.

Figure 21H:
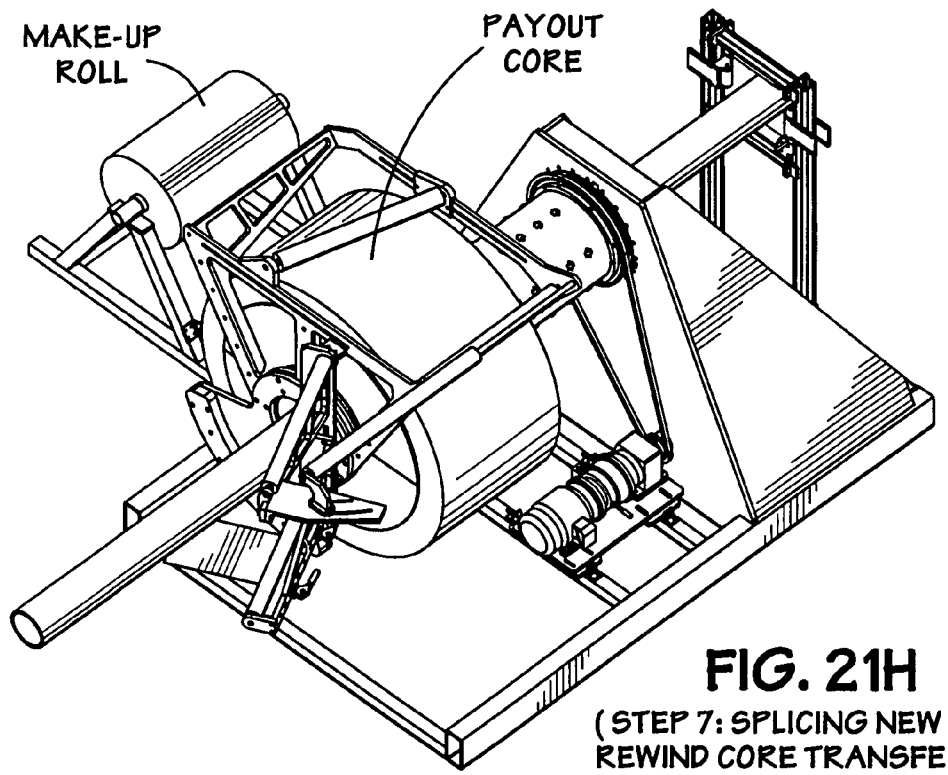
FIG. 21H is a perspective view of part of the system of FIG. 16A showing a step in its operation.
Figure 211:
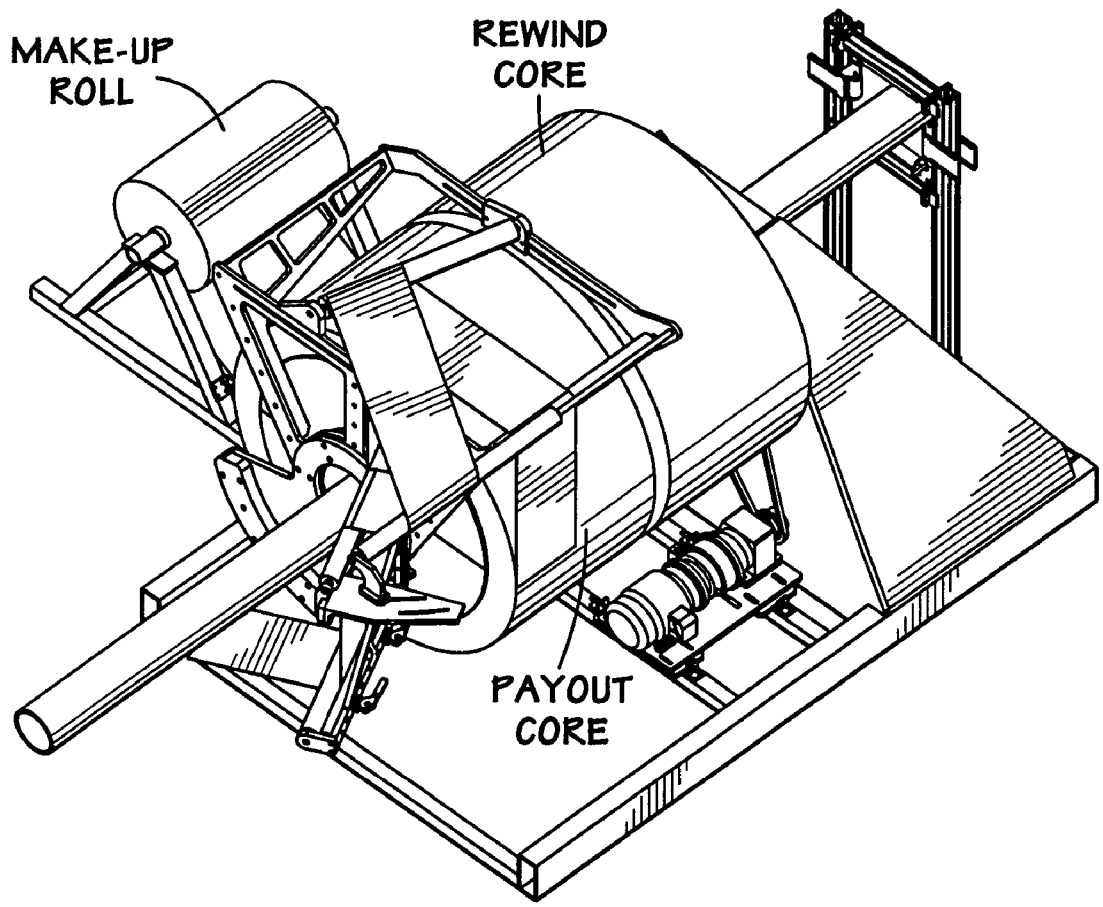

As shown in FIG. 21H the full rewind core 220 has been moved to the payout core's position and is now a payout core 210. The end of material on the new payout core 210 is spliced onto the end of material that has been wrapped on the pipe, e.g. using a high strength quick core adhesive. Simultaneously split core parts 220a, 220b are emplaced on the concentric shaft 320 producing a new rewind core 220 onto which material is then wound. FIG. 21I illustrates that split core parts have been emplaced and secured on the concentric shaft 320, a new rewind core 220 has been filled with material, and the wrapping of material 242 on the pipe has been resumed as the payout core 210 supplies the material 242 to wrap the pipe. While the deflection arm 250 is rotating/wrapping, the rewind core can be replaced and/or filled without shutting down the system.

The angular relationship or wind angle of material onto a pipe to be wrapped is adjusted and maintained by using the control system to coordinate the rotational speed of the deflection arm assembly 250 with the linear speed of the pipe moving through the system 200. In certain aspects the pipe speed is between 1 to 20 feet per minute and the wind speed is between 1 and 50 RPM's. The wind angle is a function of the line speed, wind speed, and pipe diameter. The formula is R=(S/(PI( )*D))*Tan(a); where R is the rotational speed, S is line speed in in/min, D is wind diameter in inches, and a is the wind angle. For an 8" pipe and a line speed of 48"/min, the deflection arm assembly rotates at 3.75 RPM to achieve a 63 degree wind angle.

During operation as illustrated in FIGS. 21A-21I, when the material on a payout core runs out, the rotation of the deflection arm assembly 250 is stopped and a gripping roller engages the end of the material that was being wrapped on the pipe. Simultaneously, the motor 234 is activated by a control system CS (shown schematically, FIG. 16C) and the base 226 begins to move in the direction of and at the same speed as the moving pipe so that the system 200 is maintained in a fixed relationship with the pipe so that wrapping can resume as soon as a new payout core is in position. Thus the track system serves as an accumulator and allows time for core change over. In one particular aspect the tracks are 80 feet long allowing about 20 minutes for core change over (at 4'/min line speed).

While the base 226 is moving on the tracks, the empty payout core parts are disconnected and removed from the concentric shaft 310 and the adjacent full rewind core 220 is moved into position to become the new payout core. Rewinding of a newly-installed rewind core can proceed at a significantly higher speed than rotation of the deflection arm assembly 250 (e.g., in one aspect, 50 to 100 RPM's for rewind as compared to 1.5 to 20 RPM's for wrapping; and in one particular aspect 100 RPM's rewind, 5 RPM's wrapping). Rewind is done with the material under tension and the material is locked down (e.g., but not limited to, by taping down an end of the material) so this tension is maintained. The control system CS controls the motor 234. In one aspect, a liner encoder indicates pipe speed, a rotary encoder indicates motor speed, and a PLC electronic systems uses their inputs to achieve the desired speed of the base 226.

In one particular aspect material 16 inches wide is applied to pipe with an outer diameter of 8⅝ inches. In another aspect material 8 inches wide is applied to pipe with an outer diameter of 4½ inches.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims. Any patent or patent application mentioned herein is incorporated fully herein for all purposes.

What is claimed is:

1. An apparatus for wrapping material onto and around a pipe, the apparatus comprising
   a shaft, the shaft rotatable by a driving apparatus,
   a payout core containing material to be wrapped onto a pipe, the payout core releasably mounted on the shaft,
   a deflection arm assembly secured to the shaft for rotation by the shaft, rotation of the shaft rotating the deflection arm assembly with respect to the payout core so that the deflection arm assembly takes material from the payout core and wraps the material onto a pipe adjacent the deflection arm assembly,
   each of the shaft and deflection arm assembly having a central opening through which is movable the pipe as the pipe is being wrapped,
   a rewind core releasably mounted on the shaft, the rewind core having material thereon for wrapping around the pipe,
   the rewind core positioned adjacent the payout core,
   the rewind core movable into a position of the payout core following emptying of the payout core of material for wrapping so that the rewind core becomes a new payout core,
   wherein the rewind core is located on the shaft for rewinding on the rewind core material for wrapping onto the pipe,
   wherein the deflection arm assembly is located for applying material to the pipe at a desired wind angle,
   wherein the payout core includes two halves releasably connectible together around the shaft,
   wherein the rewind core includes two halves releasably connectible together around the shaft,
   roller apparatus on the deflection arm assembly for facilitating payout of material from the payout core to the deflection arm assembly, and
   the roller apparatus including a plurality of spaced-apart rollers positioned for moving the material onto the pipe at a wind angle.

2. An apparatus for wrapping material onto and around a pipe, the apparatus comprising
   a shaft, the shaft rotatable by a driving apparatus,
   a payout core containing material to be wrapped onto a pipe, the payout core releasably mounted on the shaft,
   a deflection arm assembly secured to the shaft for rotation by the shaft, rotation of the shaft rotating the deflection arm assembly with respect to the payout core so that the deflection arm assembly takes material from the payout core and wraps the material onto a pipe adjacent the deflection arm assembly,
   each of the shaft and deflection arm assembly having a central opening through which is movable the pipe as the pipe is being wrapped, and
   counterbalance weight apparatus on the deflection arm assembly.

3. The apparatus of claim 2 further comprising
a rewind core releasably mounted on the shaft, the rewind core having material thereon for wrapping around the pipe,
the rewind core positioned adjacent the payout core,
the rewind core movable into a position of the payout core following emptying of the payout core of material for wrapping so that the rewind core becomes a new payout core for supplying material to be wrapped onto the pipe by the deflection arm assembly.

4. The apparatus of claim 3 wherein the rewind core is locatable on the shaft for rewinding material onto the rewind core for wrapping onto the pipe.

5. The apparatus of claim 3 further comprising
concentric shafts including a first concentric shaft and a second concentric shaft mounted on the main shaft with the main shaft extending through each concentric shaft, the putout core and the rewind core mounted on one of the concentric shafts,
a plurality of spaced-apart shaft rollers rotatably mounted to each concentric shaft with a portion of each shaft roller projecting outwardly beyond the shaft,
the payout core with a body with an inner surface and a plurality of grooves in the inner surface, the grooves of the plurality of grooves positioned for receipt therein of shaft rollers of the plurality of shaft rollers to facilitate emplacement of the payout core on the shaft, and
the rewind core with a body with an inner surface and a plurality of grooves in the inner surface, the grooves of the plurality of grooves positioned for receipt therein of shaft rollers of the plurality of shaft rollers to facilitate emplacement of the rewind core on the shaft.

6. The apparatus of claim 5 wherein the payout core is removable from a first position on the main shaft and the rewind core is movable into the first position.

7. The apparatus of claim 2 wherein the deflection arm assembly is located for applying material to the pipe at a desired wind angle.

8. The apparatus of claim 2 wherein the material for wrapping onto the pipe is oriented fiber material.

9. The apparatus of claim 2 wherein the material for wrapping onto the pipe is high-strength low-weight material.

10. The apparatus of claim 2 wherein
the payout core includes two halves releasably connectible together around the shaft, and
the rewind core includes two halves releasably connectible together around the shaft.

11. The apparatus of claim 2 further comprising
roller apparatus on the deflection arm assembly for facilitating payout of material from the payout core to the deflection arm assembly,
the roller apparatus including a plurality of spaced-apart rollers positioned for moving the material onto the pipe at a wind angle.

12. The apparatus of claim 11 further comprising
tension apparatus adjacent at least one of the rollers for tensioning the material as it moves past said at least one roller, and
the tension apparatus comprising adjustable tension apparatus for applying a selected tension to the material.

13. The apparatus of claim 12 wherein at least one of the rollers is position-adjustable.

14. The apparatus of claim 2 further comprising
motor apparatus connected to the shaft for rotating the shaft.

15. The apparatus of claim 14 further comprising
a support comprising a primary support member connected to and supporting the shaft, the payout core, and the deflection arm assembly, a support base on which is positioned and to which is secured the primary support member,
the motor apparatus on the support base,
the primary support member having an opening through which pipe to be wrapped is movable.

16. The apparatus of claim 15 further comprising
track apparatus,
the support base movably mounted on the track apparatus,
track drive apparatus secured to the track apparatus and connected to the support base for moving the support base on the track apparatus as pipe moves through the primary support member and through the shaft.

17. The apparatus of claim 16 wherein the support base is movable with the pipe as the pipe moves so that the deflection arm assembly is maintained in a fixed relationship with the pipe at a pipe wrapping position.

18. A method for wrapping material onto a pipe, the method comprising
placing an end of material on a pipe, the material to be wrapped on the pipe, the material extending from a deflection arm assembly to a wrapping apparatus, the wrapping apparatus comprising a shaft, the shaft rotatable by a driving apparatus, a payout core containing material to be wrapped onto a pipe, the payout core releasably mounted on the shaft, a deflection arm assembly secured to the shaft for rotation by the shaft, rotation of the shaft rotating the deflection arm assembly with respect to the payout core so that the deflection arm assembly takes material from the payout core and wraps the material onto a pipe adjacent the deflection arm assembly, each of the shaft and deflection arm assembly having a central opening through which is movable the pipe as the pipe is being wrapped, and counterbalance weight apparatus on the deflection arm assembly, and
rotating the shaft to wrap the material onto the pipe.

19. The method of claim 18 further comprising
moving the wrapping apparatus with the pipe as the pipe moves to maintain the deflection arm assembly in a fixed relationship to the pipe.

20. An apparatus for wrapping material onto and around a pipe, the apparatus comprising
a shaft, the shaft rotatable by a driving apparatus,
a payout core containing material to be wrapped onto a pipe, the payout core releasably mounted on the shaft,
a deflection arm assembly secured to the shaft for rotation by the shaft, rotation of the shaft rotating the deflection arm assembly with respect to the payout core so that the deflection arm assembly takes material from the payout core and wraps the material onto a pipe adjacent the deflection arm assembly,
each of the shaft and deflection arm assembly having a central opening through which is movable the pipe as the pipe is being wrapped,
the payout core including two halves releasably connectible together around the shaft, and
the rewind core including two halves releasably connectible together around the shaft.

21. An apparatus for wrapping material onto and around a pipe, the apparatus comprising
a shaft, the shaft rotatable by a driving apparatus,
a payout core containing material to be wrapped onto a pipe, the payout core releasably mounted on the shaft, a deflection arm assembly secured to the shaft for rotation by the shaft, rotation of the shaft rotating the deflection arm assembly with respect to the payout core so that the deflection arm assembly takes material from the payout core and wraps the material onto a pipe adjacent the deflection arm assembly, each of the shaft and deflection arm assembly having a central opening through which is movable the pipe as the pipe is being wrapped, roller apparatus on the deflection arm assembly for facilitating payout of material from the payout core to the deflection arm assembly, the roller apparatus including a plurality of spaced-apart rollers positioned for moving the material onto the pipe at a wind angle, tension apparatus adjacent at least one of the rollers for tensioning the material as it moves past said at least one roller, the tension apparatus comprising adjustable tension apparatus for applying a selected tension to the material, and at least one of the rollers being a position-adjustable.

22. An apparatus for wrapping material onto and around a pipe, the apparatus comprising a shaft, the shaft rotatable by a driving apparatus, a payout core containing material to be wrapped onto a pipe, the payout core releasably mounted on the shaft, a deflection arm assembly secured to the shaft for rotation by the shaft, rotation of the shaft rotating the deflection arm assembly with respect to the payout core so that the deflection arm assembly takes material from the payout core and wraps the material onto a pipe adjacent the deflection arm assembly, each of the shaft and deflection arm assembly having a central opening through which is movable the pipe as the pipe is being wrapped, motor apparatus connected to the shaft for rotating the shaft, a support comprising a primary support member connected to and supporting the shaft, the payout core, and the deflection arm assembly, a support base on which is positioned and to which is secured the primary support member, the motor apparatus on the support base, the primary support member having an opening through which pipe to be wrapped is movable, track apparatus, the support base movably mounted on the track apparatus, track drive apparatus secured to the track apparatus and connected to the support base for moving the support base on the track apparatus as pipe moves through the primary support member and through the shaft.

* * * * *